(12) United States Patent
Kitagawa et al.

(10) Patent No.: US 6,430,895 B1
(45) Date of Patent: Aug. 13, 2002

(54) PACKING SYSTEM ARTICLE DISTRIBUTIVE DIRECTING MECHANISM

(75) Inventors: Kazumi Kitagawa; Atsushi Fujiwara, both of Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/549,068

(22) Filed: Apr. 13, 2000

(30) Foreign Application Priority Data

Apr. 30, 1999 (JP) .............................. 11-125131

(51) Int. Cl.⁷ ................................. B65B 1/04
(52) U.S. Cl. .............. 53/247; 53/259; 53/251; 53/531
(58) Field of Search ............. 53/504, 247, 257, 53/147, 531, 540, 541, 251; 414/788.1

(56) References Cited

U.S. PATENT DOCUMENTS

| | | | | |
|---|---|---|---|---|
| 4,864,801 A | * | 9/1989 | Fallas | |
| 5,022,218 A | * | 6/1991 | Prakken | |
| 5,044,143 A | * | 9/1991 | Ako et al. | |
| 5,279,099 A | * | 1/1994 | Goodman et al. | |
| 5,284,003 A | * | 2/1994 | Goodman et al. | |
| 5,343,671 A | * | 9/1994 | Tisma | |
| 5,588,285 A | * | 12/1996 | Odenthal | |
| 5,622,025 A | * | 4/1997 | Kitagawa et al. | |
| 5,743,375 A | | 4/1998 | Shyr et al. | |
| 5,802,803 A | * | 9/1998 | Kitagawa et al. | |
| 5,881,532 A | * | 3/1999 | Kitagawa | |
| 6,047,527 A | * | 4/2000 | Pazdernik et al. | |

FOREIGN PATENT DOCUMENTS

| | | |
|---|---|---|
| DE | 3604562 A | 8/1987 |
| GB | 1053712 A | 1/1967 |

\* cited by examiner

*Primary Examiner*—Eugene Kim
(74) *Attorney, Agent, or Firm*—Shinjyu Global IP Counselors, LLP

(57) ABSTRACT

A directing unit 2, which directs bags P arranged in one line of feed rollers 23 to two lines in a packing system for packing the bags P conveyed in one line from a previous process, includes eccentric pulleys 25, a belt 26, and a bag holding plate 28d. The belt 26 applies a force containing a component in the horizontal direction to the bags P in a direction crosses the conveyance direction thereof. The bag holding plate 28d is disposed above the feed rollers 23 and controls a lift of the bag P so that the bag P is not lifted more than a predetermined height when the force is applied to the bag P by the belt 26.

13 Claims, 33 Drawing Sheets

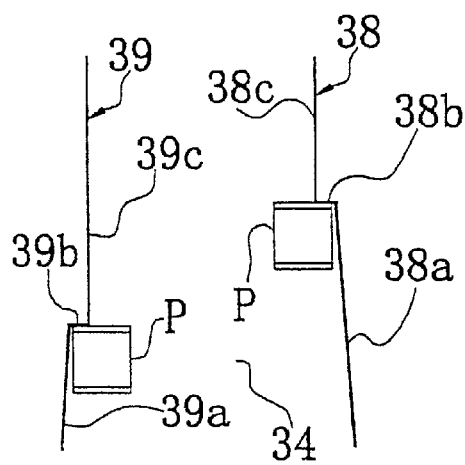
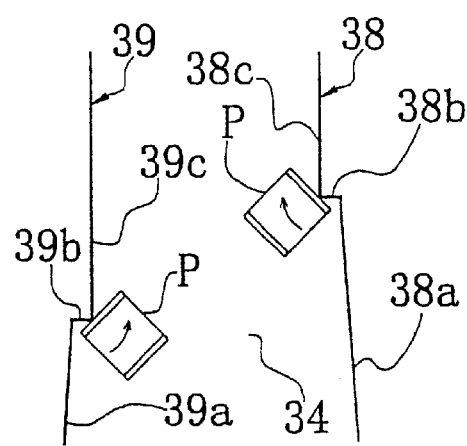
Fig. 12A          Fig. 12B
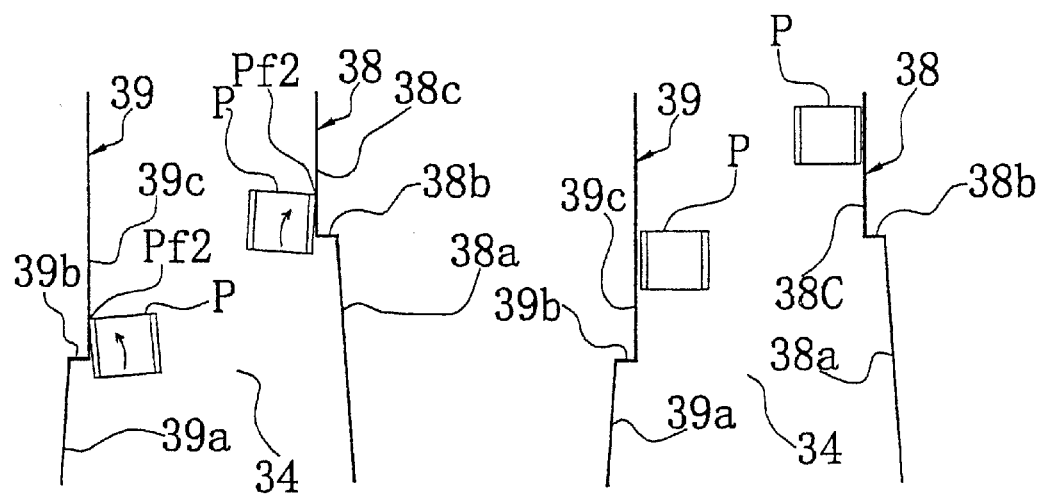
Fig. 12C          Fig. 12D

PACKING SYSTEM ARTICLE DISTRIBUTIVE DIRECTING MECHANISM

BACKGROUND OF THE INVENTION

1. Technical Field

The present invention relates to article-directing mechanisms for packing systems. More specifically, the present invention relates to article directing mechanisms, employed in packing systems that pack articles conveyed from previous processes, for distributively directing articles along conveyance means.

2. Description of Related Art

Conventionally, a predetermined number of goods are packed in a box such as a cardboard box when the goods manufactured in, for instance, a factory are to be forwarded to wholesale or retail stores. Although this kind of packing operation is often carried out manually, various automated packing systems have been proposed.

An example of an automated packing system in packing system 90 is shown in FIG. 27. The packing system 90 is for packing bagged articles or goods, which have been produced by a processed bagging device in a previous process, in a cardboard box C.

The articles are conveyed in a line by means such as a conveyer system from the previous process. The articles are, first of all, checked that they have been properly sealed when they are on a conveyer 91. In this process, the articles, which were bagged by the processed bagging device, are checked to ensure proper sealing and bagging.

Next, the weight of each of the bagged articles is checked when it is on a conveyer 92. Articles which have been determined to have improper weight or to have been improperly sealed are passed through a conveyer 93 to exit from the line as inferior.

The articles that have passed the seal and weight check are transferred from the conveyer 93 to a conveyer 95 by a position changing mechanism 94. The position changing mechanism 94 is for changing the direction of the articles so as to be suitable for being packed in a box. The position changing mechanism 94 holds an article from the conveyer 93 by suction and, if necessary, changes the orientation of the article by 90 degrees by rotating the article while transferring it.

When a predetermined number of articles are lined up on the conveyer 95, these articles are held together by suction and moved by a suction holder 96a of a stacking mechanism 96. The stacking mechanism 96 stacks a plurality of articles in a row in front of an opening of the cardboard box C, which lays sideways on a conveyer 98. Note that the cardboard box C is constructed and its bottom taped by a box constructing mechanism (not shown in the figure). After being retained by a holding mechanism (not shown in the figure), the box is toppled over sideways by changing the position of a holder in the holding mechanism. A pusher 97 pushes the articles that have been stacked in a row in front of the opening into the cardboard box C. The pusher 97 is disposed in a position opposite the cardboard box C across the articles. Then, the cardboard box C is again held by the holding mechanism. The cardboard box is then returned to an upright position. Afterwards, the number of articles in the cardboard box C is checked on a conveyer 99 by measuring the weight of the box C. The box C is then sent to later processes such as sealing of the box or labeling.

Using a system such as the above-described packing system 90 automates packing operations which had been conducted manually thus far, enabling the packing operations to be quickly and efficiently executed.

Various forms of packing exist, however. Unlike the above-described packing system 90 in which articles conveyed in a line from a previous process are packed in rows, it may be necessary to distributively direct a line of articles into a plurality of further lines for packing. In addition, in order to raise processing speed in the packing operation as a whole, it may be necessary at one point to direct articles in a line distributively into a plurality of lines along the course of the packing system.

In the foregoing cases, use of a directing mechanism for distributively directing articles may be necessary. Conceivably, the position changing mechanism 94 could be utilized in the above-described packing system 90. Articles in a line could thereby be distributed to a plurality of lines when they are transferred from the conveyer 93 to the conveyer 95. Wherein such a modification may not be practical for structural and cost reasons, a separate distributive directing mechanism that suction-grabs goods by means of a suction holder and distributively directs the goods so that the line of articles flows along into a plurality of lines could conceivably be established.

There are limitations, however, to adapting the distributive directing mechanism that suction-grabs goods, and shifts the suction holder and releases the suction so as to put them into a plurality of lines. For structural reasons, securing a processing speed higher than a certain level is difficult. Further, the processing speed of the directing mechanism does not match the conveyance speed of goods flowing from the previous process. In other words, to secure sufficient speed in distributively directing conveyance goods from one line into a plurality of lines with the mechanisms that suction-grab the goods as has been conventional is in most cases inadequate.

Accordingly, a need exists for an article directing mechanism for a packing system that overcomes the above described problems in the prior art. This invention addresses this need in the prior art as well as other needs, which will become apparent to those skilled in the art from this disclosure.

SUMMARY OF THE INVENTION

One of the objects of the present invention is in a packing system for packing goods conveyed from previous processes, to provide an article directing mechanism for distributively directing articles on a conveyance means, wherein the mechanism handling speed in distributively directing the articles is high.

A directing unit, which is to direct bags arranged in one line of feed rollers to two lines in a packing system for packing the bags conveyed in one line from a previous process, includes eccentric pulleys, a belt, and a bag holding plate. The belt applies a force containing a component in the horizontal direction to the bags in a direction crosses the conveyance direction thereof. The bag holding plate is disposed above the feed rollers and governs lift of the bags so that they are not lifted more than a predetermined height when the force is applied to the bags by the belt.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIGS. 12A–12D are plan view diagrams illustrating position change of bags by the position-adjusting unit;

DETAILED DESCRIPTION OF THE PREFERRED EMBODIMENTS

Figure 1:
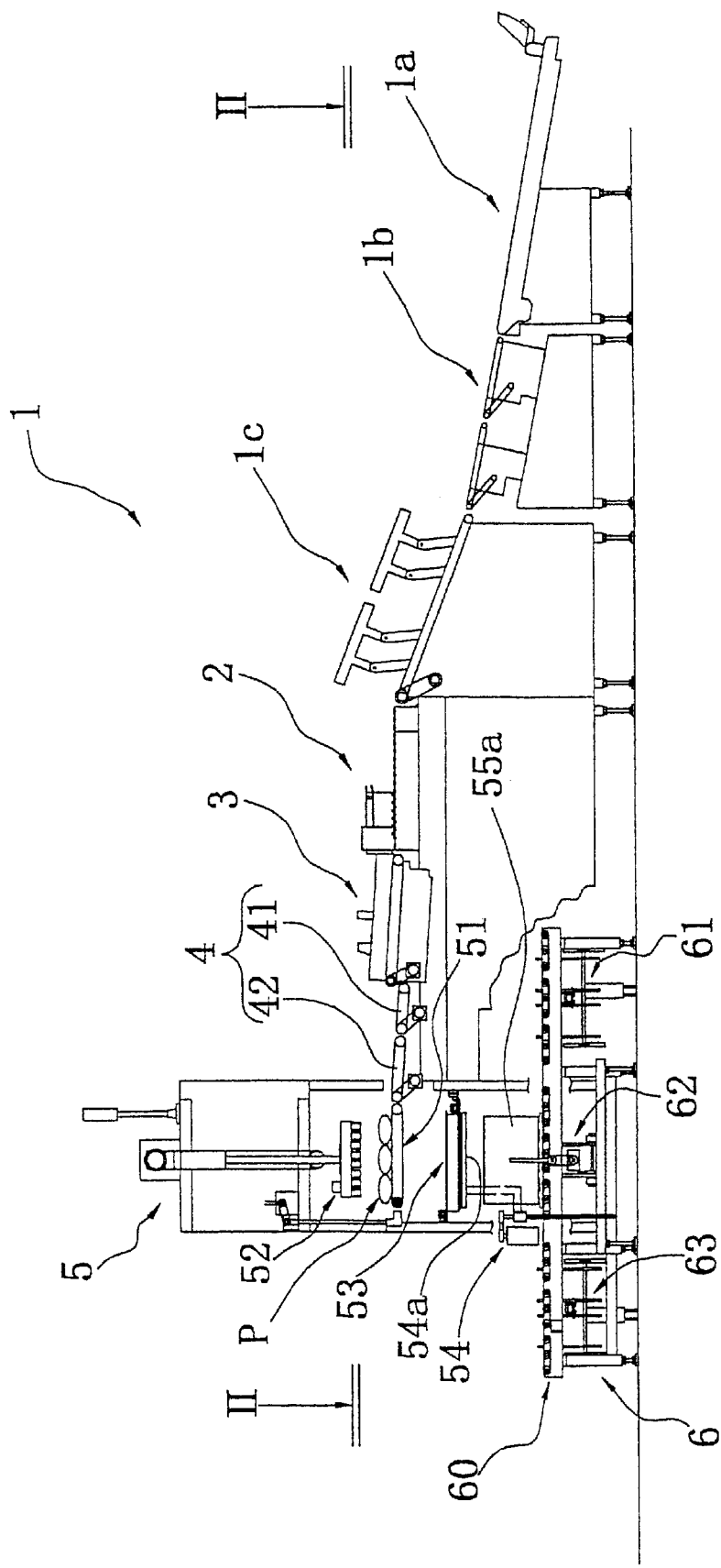
FIG. 1 is a schematic cross sectional elevational view of a packing system including the present invention.
Figure 2:
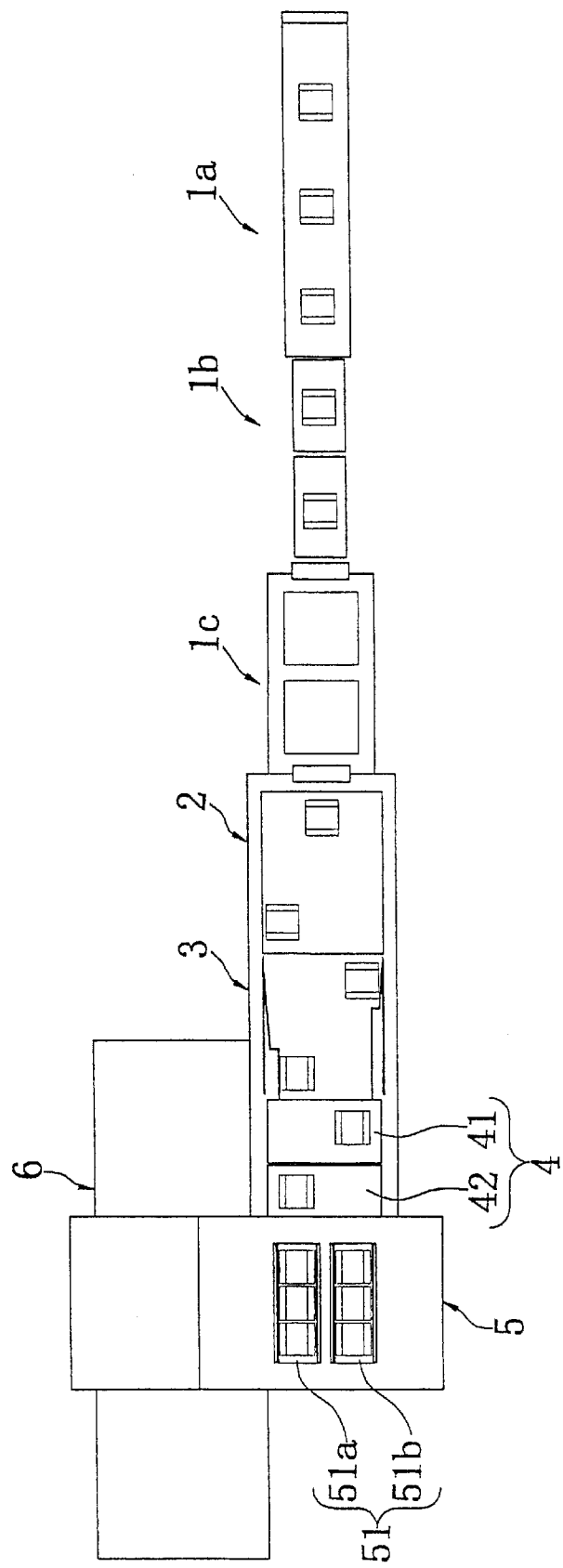
FIG. 2 is a diagrammatic plan view of the embodiment shown in FIG. 1 as viewed across the line II—II shown in FIG. 1.

Referring to FIGS. 1 and 2, a packing system 1 shown is an automated packing system for packing bags that have passed a sealing check and weight check in a cardboard box. The bags contain articles. In this embodiment, the bag that contains the article is packed in a box. The bag is a product conveyed from a processed bagging device in a weighing and bagging system used in the previous process of the packing system 1. The bag contains a weighed article such as potato chips in a film-treated bag that is sealed.

Packing System Configuration

As shown in FIGS. 1 and 2, the packing system 1 includes, from an upper stream of a bag conveyance pathway: a conveyance unit 1a; a weight checking unit 1b; a seal checking unit 1c; a directing unit 2; a position-adjusting unit 3; a conveyance-adjusting conveyer 4; a packing unit 5; and a cardboard box-transferring unit 6.

Packing System Operational Outline

A sealed bag from the processed bagging device used in the previous process is, firstly, conveyed to the weight-checking unit 1b by the conveyance unit 1a to check the weight. Then, the seal-checking unit 1c checks the bag to ensure that it is completely sealed. Bags that are determined to be inferior by these checking units are immediately discharged from the line through a discharging portion (not shown in the figures.)

The bags which have passed both checking units are directed alternately to a right or left (up and down in FIG. 2) direction in the directing unit 2. In this way, the bags that have been conveyed in a line will be conveyed in two lines until they reach the packing unit 5.

Figure 27:
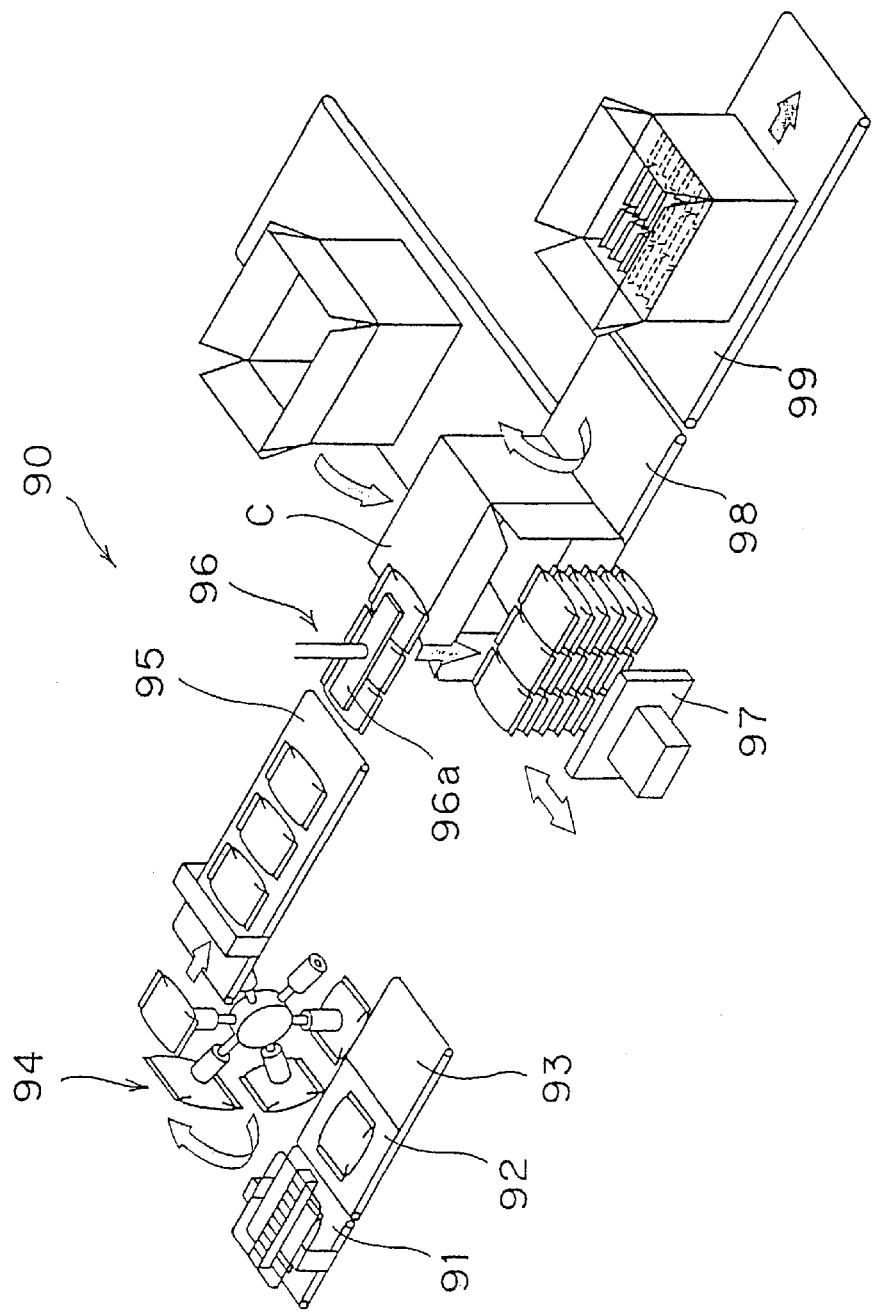
FIG. 27 is a schematic perspective view of a conventional packing system.

The bags that are directed in the two directions by the directing unit 2 are conveyed to the position-adjusting unit 3. In the position-adjusting unit 3, the position of each bag in the right and left direction is adjusted so that the bags are to be packed in a cardboard box horizontally. If the bags are to be packed vertically in a box, the position of each bag will be further changed 90 degrees. In the former case, each of the bags is packed in a box so that the sealed portions of the bag face the respective side of the box when the box is in a normal standing state. In the latter case, each of the bags is packed in a box so that the sealed portions of the bag face the respective top and bottom portion of the box when the box is in a normal standing state (referring to FIG. 27).

After their positions or states are adjusted in the position-adjusting unit 3, the conveyance-adjusting conveyer 4, which includes two conveyers 41 and 42, conveys the bags to the packing unit 5.

In the packing unit 5, the bags conveyed in two lines are stacked in a line or respective row by using a stacking device, which will be described later. The bags are then pushed in a cardboard box placed on the cardboard box-transferring unit 6.

When the bags are pushed in the cardboard box the packing operation is completed. The position of the cardboard box is changed from the laid-down or horizontal state to a raised-up (standing) or vertical state by a box-raising device 63, which will be described later. Then the cardboard box is conveyed to a cardboard box sealing device (not shown in the figure) which is disposed at the downstream of the cardboard box-transferring unit 6.

Packing System Structural Unit Details

Next, main units constituting the packing system 1 will be described in detail and in order.

Directing Unit

Directing Unit Structure

FIGS. 3 through 6 are perspective diagrams of each part constituting the directing unit 2. The directing unit 2 mainly includes a motor 22, feed rollers 23, an AC servomotor 24, shafts 24b and eccentric pulleys 25, V-belts (force imparting member) 26, guides 27, a holding plate (holding member) 28*d*, and a photo sensor 29. Each of these structural parts is fixed to or supported by a frame 21.

Figure 3:
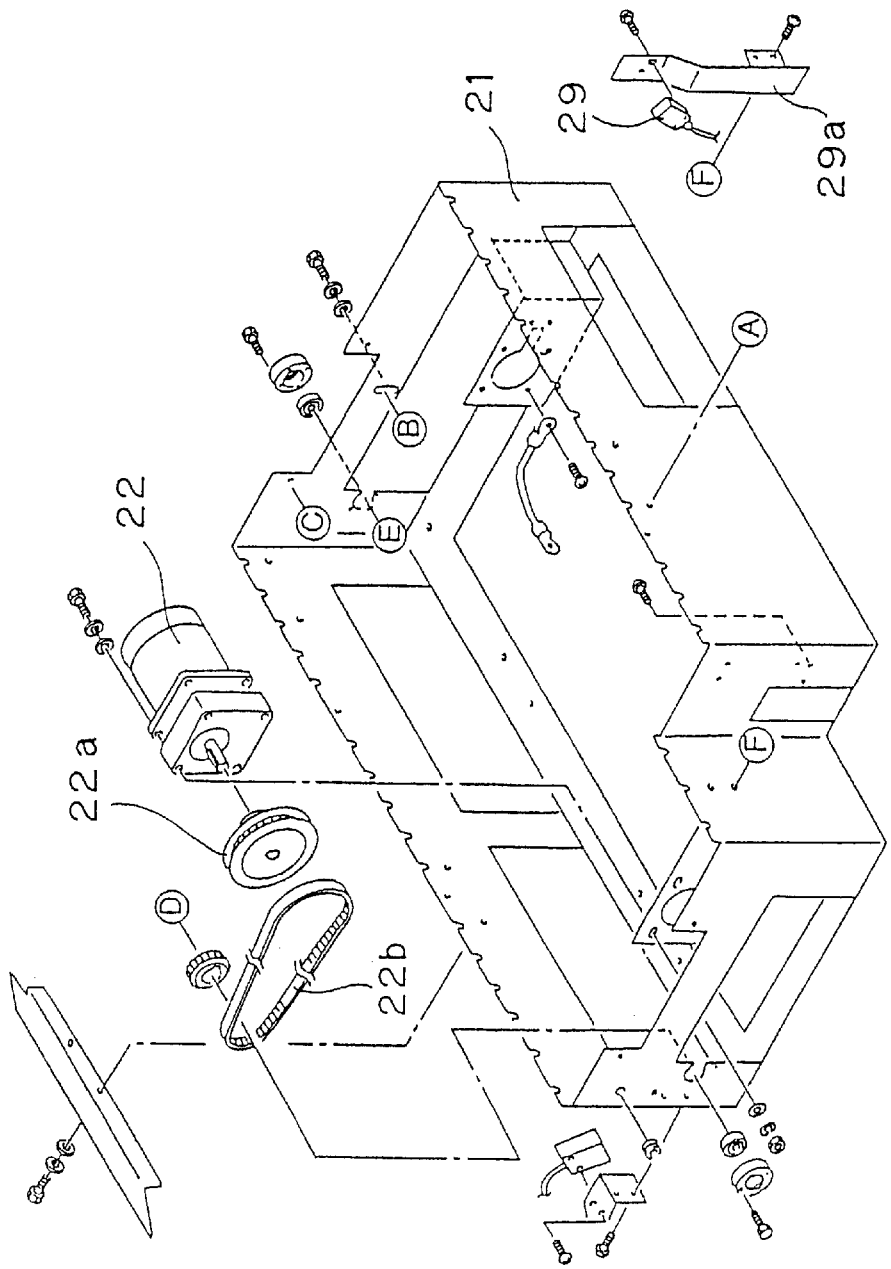
FIG. 3 is an exploded oblique view of a directing unit including frames.
Figure 4:
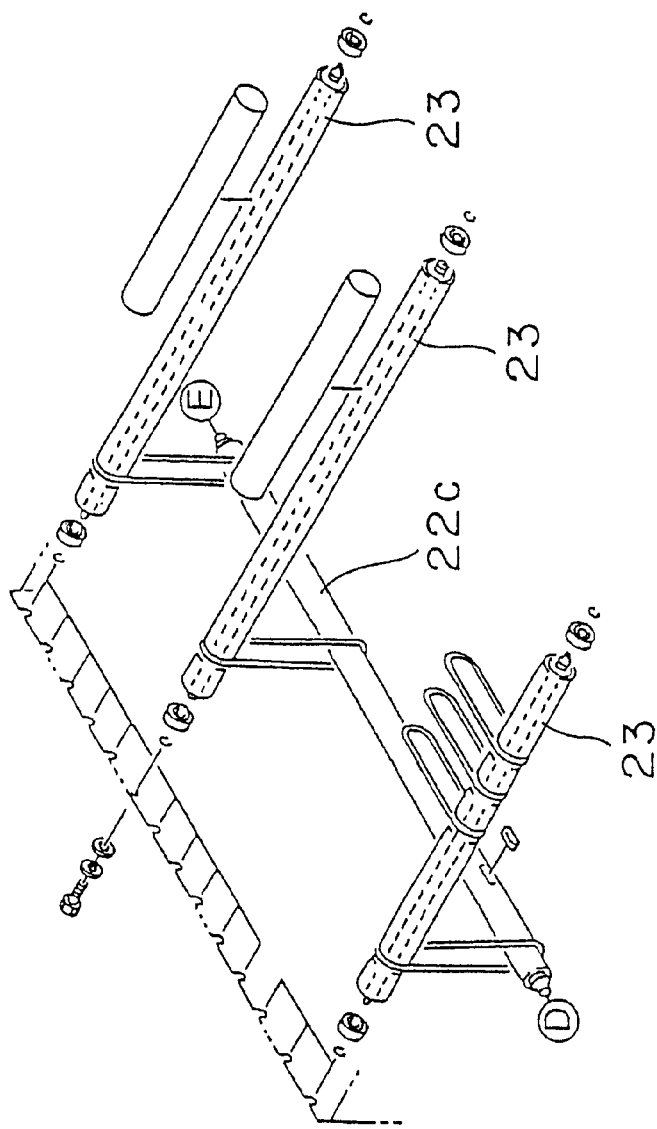
FIG. 4 is an exploded oblique view of the directing unit shown in FIG. 3 showing feed rollers.

As seen in FIG. 4, the plurality of feed rollers 23 are provided with a proper space between each other in order to convey bags carrying on their upper surfaces. Both ends of each of the feed rollers are supported by the respective side of the frame 21 and coupled to the shafts 22*c*, which is arranged at a right angle, by a belt so that the feed rollers rotate when the shafts 22*c* rotate (referring to FIG. 4). As shown in FIGS. 3 and 4, the shafts 22*c* are supported by the front and the back surfaces of the frame 21. The shafts are coupled to the motor 22 via a timing pulley 22*a* and a belt 22*b* so that they rotate in accordance with the rotation of the motor 22.

Figure 5:
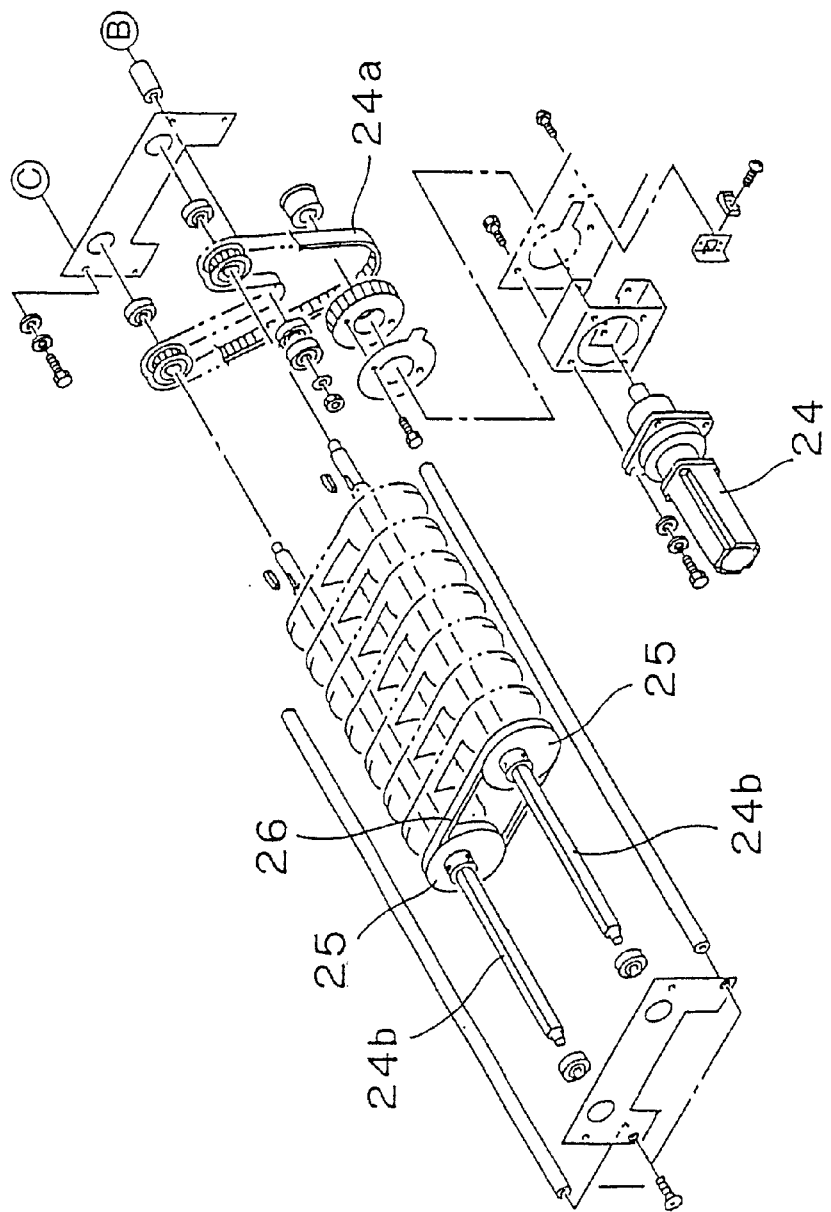
FIG. 5 is an exploded oblique view of the directing unit shown in FIG. 3 showing eccentric pulleys.

As shown in FIGS. 3 and 5, the AC servomotor 24 is fixed to a side of the frame 21 via a bracket. The AC servomotor 24 rotates the two shafts 24*b*, which are supported by the front and back surfaces of the frame 21, while changing the rotational angle thereof via the timing belt 24*a*. As shown in FIGS. 7A–E, the two shafts 24*b* are disposed at a respective position that is lower than the position of the feed rollers 23 so that they do not interfere with the feed rollers 23.

A plurality of eccentric pulleys 25 having a V-shape groove is attached to each of the shafts 24*b* in an eccentric state relative to the rotation center of the respective shaft 24*b*. The eccentric pulley 25 which is provided with one of the shafts 24*b* forms a pair with one that is provided with the other shaft 24*b*. The V-belt 26 is provided with each pair of the eccentric pulleys 25 in a direction that crosses the conveyance direction of the bags at right angle (referring to FIG. 5). The outer surface (transferring surface) of the V-belt 26 is made of certain materials or subjected to certain processes so that it has a frictional resistance sufficient to convey a bag P. Rubber stuff may be used in the materials, for example, and as a surface treatment unevenness processing may be implemented. Also, the positions in which the eccentric pulleys 25 are fitted with respect to the shaft 24*b* are located such that either is staggered in a plane, and thus the eccentric pulleys 25 and the V-belts 26 do not interfere with the feed rollers 23 (referring to FIGS. 7A–E). Moreover, their relationships are predetermined. Thus, when the eccentric pulleys 25 rotate in accordance with the rotation of the shafts 24*b*, the outer periphery of each eccentric pulley 25 and the V-belt 26 are exposed to a region above the upper surface of the feed roller 23 within a certain rotational region of the pulleys. Further, the eccentric pulleys are not exposed within the other rotational region of the pulleys.

Figure 6:
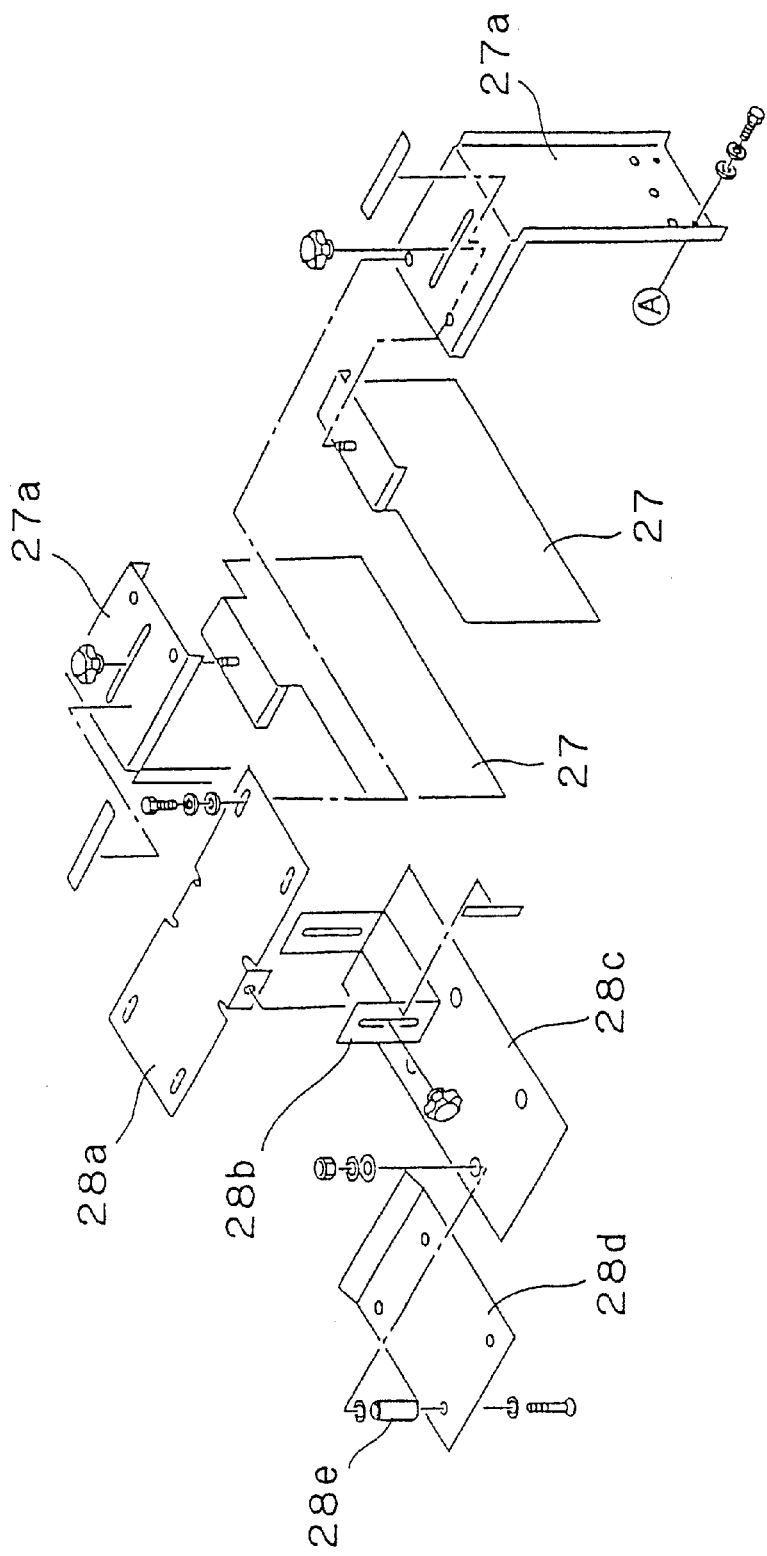
FIG. 6 is an exploded oblique view of the directing unit shown in FIG. 3 showing a bag holding plate.

The guides 27 and the holding plate 28*d* are disposed at the same position as the eccentric pulleys 25 and the V-belt 26 in the conveyance direction. As seen in FIG. 6, the guides 27 are also supported by the side surface of the frame 21 via a pair of brackets 27*a* The lower surface (holding surface) of the holding plate 28*d* is subjected to a treatment decreasing its frictional resistance so that the conveyance of the bag P in the horizontal direction can be carried out smoothly. For example, a buff-finishing process can be carried out to eliminate surface irregularities as much as possible. A plate 28*a* is disposed between the pair of brackets 27*a*, which is fixed to the respective side of the frame 21, and fixed thereto. An up-and-down member including a horizontal plate 28*c* and a vertical plate 28*b* having elongated holes extending in the vertical direction is attached to the plate 28*a*. The up-and-down member is coupled to the plate 28*a* by a bolt penetrating the respective elongated hole of the vertical plate 28*b* with a little space between each other so that the up-and-down member can move in the up-and-down direction relative to the plate 28*a*. Also, the holding plate 28*d* is disposed below the horizontal plate 28*c* of the up-and-down member and they are fixed to each other via a cylindrical rod. The holding plate 28*d* is also horizontally disposed in the same manner as the horizontal plate 28*c* (referring to FIGS. 7A–E). Moreover, the holding plate 28*d* is positioned at a certain height in the horizontal direction so that the distance to the top dead point of the outer surface of the eccentric pulley 25 exposed by its rotation becomes a little smaller than the thickness of the bag P. carried out smoothly. For example, a buff-finishing process can be carried out to eliminate surface irregularities as much as possible. A plate 28*a* is disposed between the pair of brackets 27*a*, which is fixed to the respective side of the frame 21, and fixed thereto. An up-and-down member including a horizontal plate 28*c* and a vertical plate 28*b* having elongated holes extending in the vertical direction is attached to the plated 28*a*. The up-and-down member is coupled to the plate 28*a* by a bolt penetrating the respective elongated hole of the vertical plate 28*b* with a little space between each other so that the up-and-down member can move in the up-and-down direction relative to the plate 28*a*. Also, the holding plate 28*d* is disposed below the horizontal plate 28*c* of the up-and-down member and they are fixed to each other via a cylindrical rod. The holding plate 28*d* is also horizontally disposed in the same manner as the horizontal plate 28*c* (referring to FIGS. 7A–E). Moreover, the holding plate 28*d* is positioned at a certain height in the horizontal direction so that the distance to the top dead point of the outer surface of the eccentric pulley 25 exposed by its rotation becomes a little smaller than the thickness of the bag P.

Also, a pair of right and left guides 27 is provided and extends in the conveyance direction of the bag. These guides are provided so as to hold the holding plate 28*d* from the right and left directions as shown in FIGS. 7A–E. The upper end of the guide 27 is located at a position higher than the holding plate 28*d*. These guides 27 are fixed to the bracket 27*a* by bolts penetrating an elongated hole formed on the upper surface of the bracket 27*a*. However, it is possible to adjust the right-hand and left-hand side positions of the guide 27 relative to the bracket 27*a* depending on the type and size of the bags.

As seen in FIG. 3, the photo-sensor 29 is attached to the front portion of the side of the frame 21 via a bracket 29*a*. The photo-sensor 29 detects that a bag is conveyed from the seal-checking unit 1*c* to the feed rollers 23 of the directing unit 2 shown in FIGS. 1, 2, and 4. The detecting signal is transmitted to a controller of the directing unit 2, which is not shown in the figure. The controller of the directing unit 2 is provided for controlling the drive of each motor, especially, the AC servomotor 24. The controller of the directing unit 2 rotates the AC servomotor 24 a predetermined number of times in a predetermined direction after a predetermined time interval upon receiving the detection signal from the photo-sensor 29.

Directing Unit Operation

Referring to FIGS. 3 and 4, when bags are conveyed in a line from the seal checking unit 1*c* to the directing unit 2, the bags are carried on the feed rollers 23. The bags are sent in a downstream direction of the conveyance by the feed rollers 23. When the bags are transferred to the directing unit 2, they are detected by the photo-sensor 29 and signals are transmitted to the controller.

Then, the controller calculates the time when a bag reaches a space above the eccentric pulleys 25 and the V-belt 26 and below the holding plate 28*d* from the rotation speed of the motor 22 and the time passed from receiving the detection signal from the photo-sensor 29. The controller rotates the AC servomotor 24 in one direction at a predetermined angle. The predetermined angle is set to be the angle that causes one rotation of the eccentric pulley 25.

The bag is directed to either a right or left direction by a force applied from a side direction thereof during the rotation of the eccentric pulley 25. This is illustrated in FIGS. 7A–E.

Figure 7A:
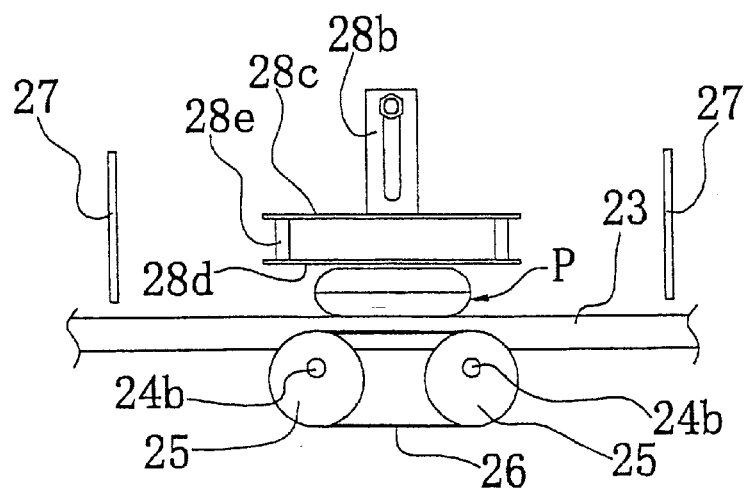
FIGS. 7A–7E are diagrams depicting, in elevational section, operation of the directing unit shown in FIG. 3.

FIG. 7A shows a state in which the bag P is conveyed to a space above the eccentric pulleys 25 and the belt 26. Here, the upper surfaces of the eccentric pulleys 25 and the V-belt 26 are located at a position lower than the upper surface of the feed roller 23, and the bag P is placed on the central portion of the upper surface of the feed roller 23.

Figure 7B:
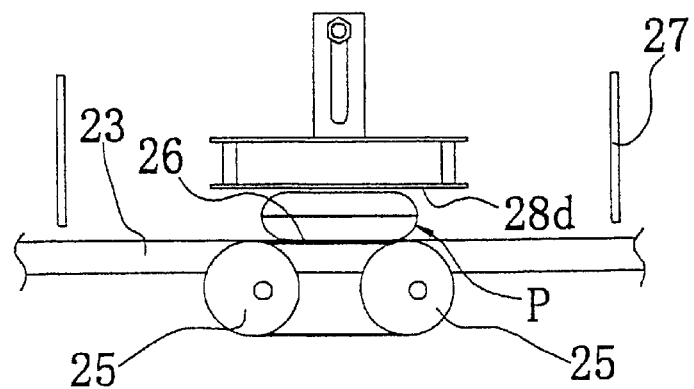

When the pulleys 25 are rotated and enters a state shown in FIG. 7B, the upper surface of the V-belt 26 connecting the eccentric pulleys 25 makes contact with the bag P, and a force is applied to the bag P. This force is along the movement of the V-belt 26 and crosses the conveyance direction of the bag P by the feed rollers 23 at right angle. The force slants in a upper direction and includes a force component in the horizontal direction and a force component in the vertical upward direction (referring to the direction of the white arrow in FIG. 7C).

Figure 7C:
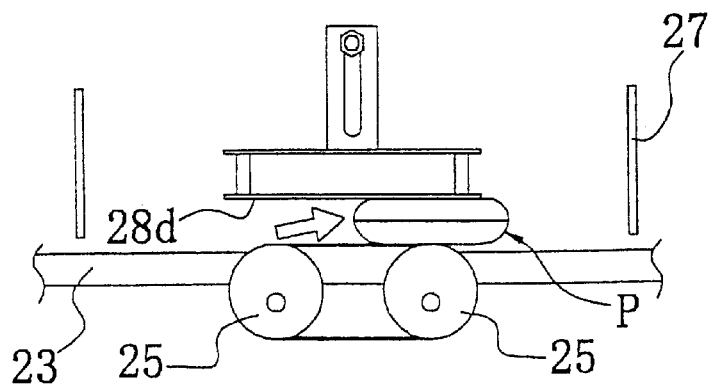

When the V-belt 26 makes contact with the bag P, the bag P is pushed up in the slant upper direction as shown in FIG. 7C. At this time, the upper surface of the pulleys 25 and the upper surface of the V-belt 26 are located at higher positions than the position of the upper surface of the feed rollers 23. When the pulleys 25 are further rotated the upper surface of the pulleys 25 and the upper surface of the V-belt 26 further push up the lower surface of the bag P. Since the holding plate 28d is fixed and the distance to the top dead center of the outer surface of the eccentric pulley 25 is a little smaller than the thickness of the bag P as mentioned above, the bag P is compressed in its thickness direction.

The lower surface of the holding plate 28d is made so as not to prevent the movement of the bag P in the horizontal direction. In addition, the surface of the V-belt possesses frictional resistance sufficient to convey the bag P. Thus, the compressed bag P moves outwardly as shown in FIG. 7D.

Figure 7D:
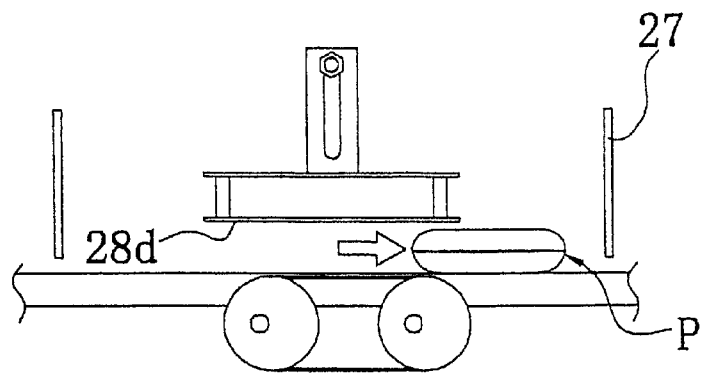
Figure 7E:
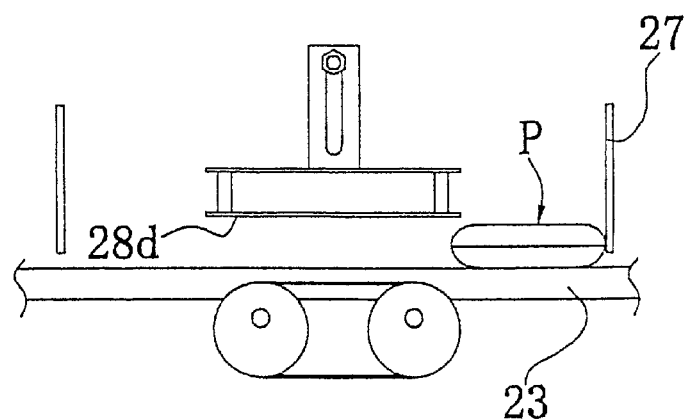

Then, when the bag P hits the guide 27, as shown in FIG. 7D as solid vertical lines, the guide 27 stops the movement of the bag P in the horizontal direction.

In this manner, the bag P that is slid from the central upper surface of the feed roller 23 to the end upper surface thereof is conveyed to the position-adjusting unit 3 by the feed rollers 23.

As mentioned above, the bag P is directed to either a right or left direction when the eccentric pulleys 25 rotate once, and the actual direction of the bag P is determined by the control of the AC servomotor 24 by the controller. In this embodiment, the AC servomotor 24 is controlled so that the eccentric pulley 25 rotates once in the right-hand side direction after it rotates once in the left-hand side direction. Alternatively, the eccentric pulley 25 rotates once in the left-hand side direction after it rotates once in the right-hand direction. In this manner, the conveyed bags P can be directed alternately to the right-hand side or left-hand direction.

The bags P are alternately slid in the right-hand or left-hand direction by applying a force to the bags P using the V-belt 26 connecting the eccentric pulleys 25 in the directing unit 2. Thus, the bags P, which have been conveyed in a line from the seal checking unit 1c, can be arranged in two lines after passing the directing unit 2.

Present Invention Directing Unit Characteristics

The directing operation is carried out by applying a force to the bag P in a substantially right angle direction to the conveyance direction of the bags P by the feed rollers 23 in the directing unit 2 according to the present invention. Thus, the speed of the directing operation is increased as compared with methods in which the bags P are held by suction, moved, and released.

Also, since the directing operation is performed while the bag P is in a compressed state, an error in directing the bag P can be prevented. Directional errors can happen when the weight of the bag P is very small or if a loss of driving transmission occurs when the cross section of the bag P in the conveyance direction is circular.

Moreover, since the guide 27 is present, the bag P can be prevented from moving excessively in an outward direction.

Further, although the operation in which the holding plate 28d and the up-and-down members (28b and 28c) does not move is explained above, it is possible to shift the holding plate 28d in the upward direction in order to prevent damage to contents in the bag P if the contents in the bag P are fragile. In addition, if it is desired to put the contents in the bag P in order, it is possible to shift the holding plate 28d in the downward direction to actively conduct such an operation.

Position-Adjusting Unit

Position-Adjusting Unit Structure

Figure 8:
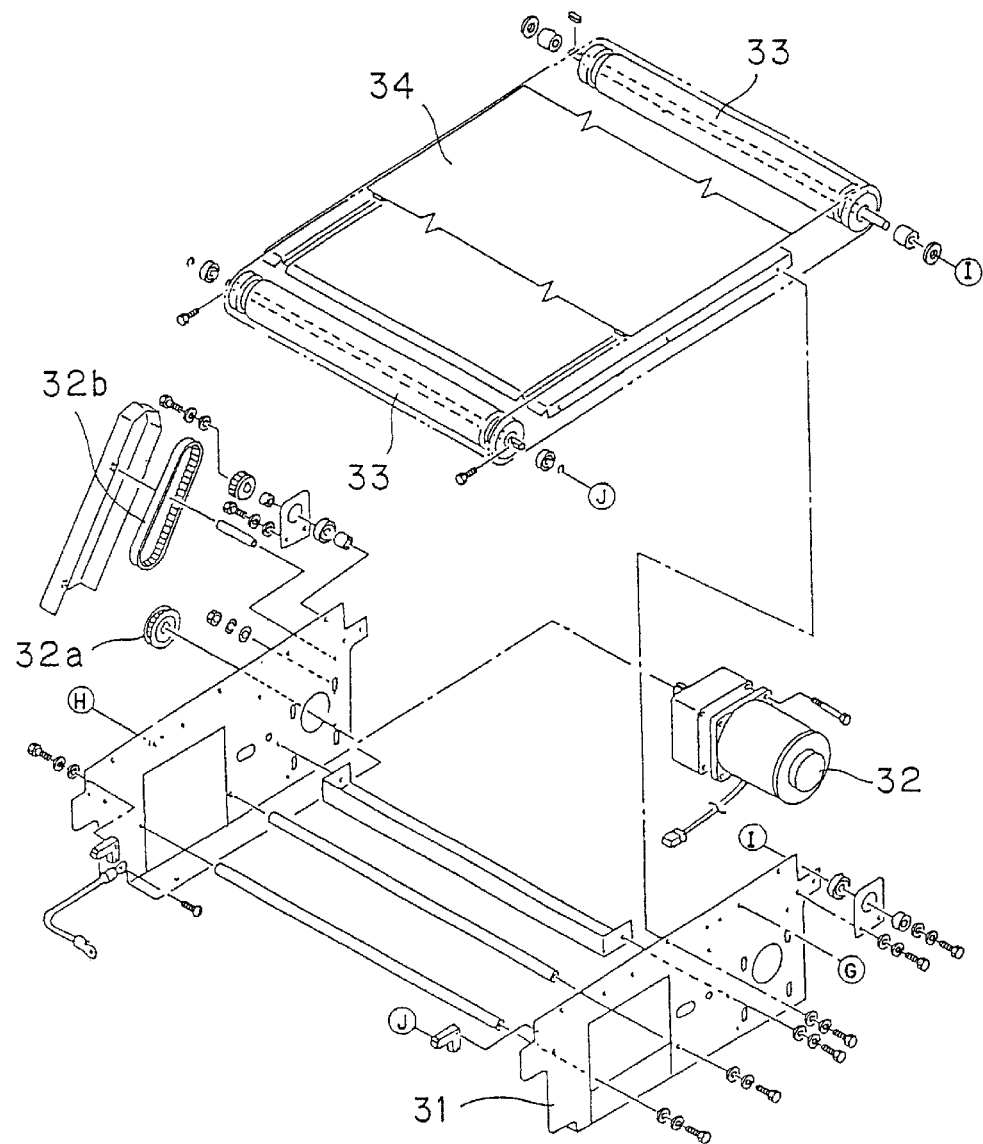
FIG. 8 is an exploded oblique view of a positionadjusting unit showing a flat belt.
Figure 9A:
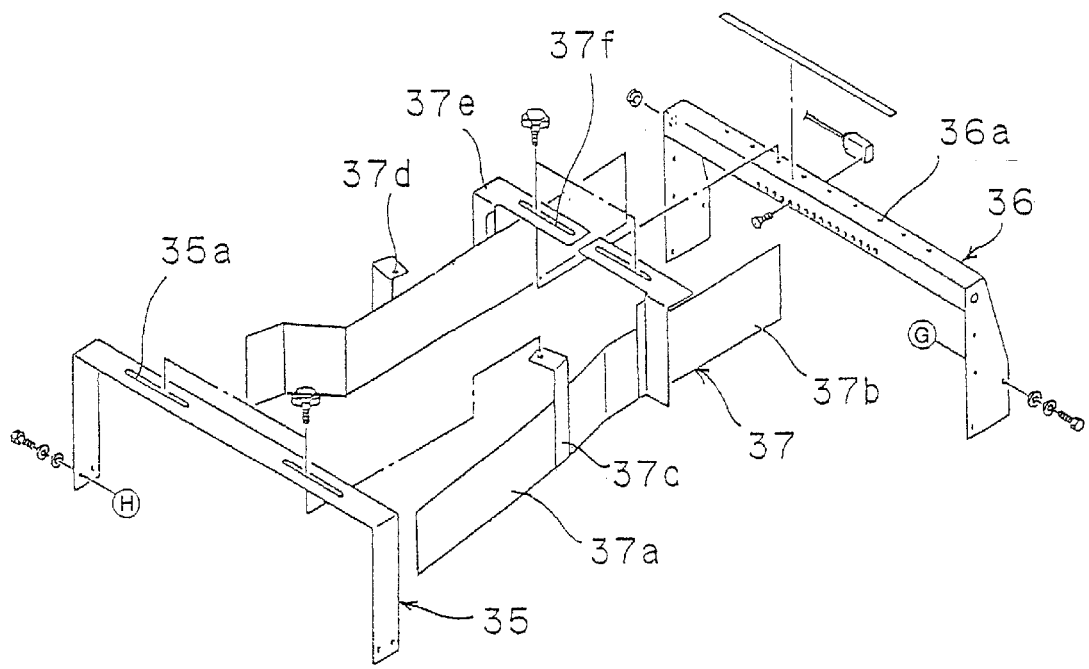
FIGS. 9A and 9B are exploded oblique views of the position-adjusting unit showing guides.
Figure 9B:
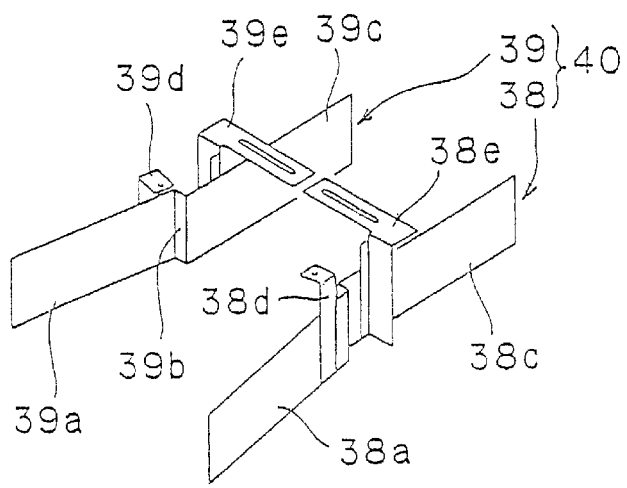

FIGS. 8, and 9A and 9B are perspective views showing each part constituting the position-adjusting unit 3. The position-adjusting unit 3 mainly includes a motor 32, rollers 33, a flat belt 34, a front support 35, and a rear support 36. Each of these structural parts are fixed to or supported by a frame 31. Also, a location-adjusting guide 37 and a position changing guide 40, both of which can be attached to both supports 35 and 36, are provided. The location adjusting guide 37 and position changing guide 40 are selectively used depending on packing goals.

The rollers 33 are disposed at the front and the back of the position--adjusting unit 3. The frame 31 supports the ends of the rollers 33. These rollers 33 are coupled to the motor 32 via a timing pulley 32a and a timing belt 32b. The rollers 33 rotate in accordance with the motor 32.

In addition, a flat belt 34 is provided between the rollers 33, so that rotating the motor 32 conveys articles on the flat belt 34.

The front support 35 and the rear support 36 are arch shaped supports and both ends thereof are fixed to the frame 31. Two elongated holes 35a are formed on the front support 35 and a plurality of screw holes 36a is provided with the rear support 36.

The location adjusting guide 37 shown in FIG. 9A and the position changing guide 40 shown in FIG. 9B are provided in order to adjust the right and left positions of a bag conveyed on the flat belt 34 and, if necessary, to change the position of the bag by 90 degrees. One of these guides 37 and 40 is selected and attached to the supports 35 and 36. More specifically, the location adjusting guide 37 is used when bags are packed in a cardboard box in the horizontal direction. The position-changing guide 40 is used when bags are packed in a cardboard box in the vertical direction.

The location-adjusting guide 37 includes a pair of right and left members. Each of the members has an inclined surface 37a, a non-inclined surface 37b, and brackets 37c and 37e. The inclined surface 37a is inclined so that it approaches near to the inside of the line as it goes towards the downstream of conveyance direction of bags. The non-inclined surface 37b extends from the downward end of the inclined surface 37a in the conveyance direction of the bags. The brackets 37c and 37e are provided in order to fix the inclined surface 37a and the non-inclined surface 37b in a vertically standing state to the supports 35 and 36. The brackets 37c and 37e extend upwardly from the inclined surface 37a or the non-inclined surface 37b. A screw hole 37d is formed on the upper surface of the bracket 37c. The bracket 37c is fixed to the front support 35 by screwing a bolt. The bolt penetrates the elongated hole 35a of the front support 35 into the screw hole 37d. In addition, an elongated hole 37f is formed on the upper surface of the bracket 37e. The bracket 37e is fixed to the rear support 36 by screwing a bolt, which penetrates the elongated hole 37f, into the screw hole 36a of the rear support 36.

Although the location adjusting guide 37 is fixed to the supports 35 and 36 in the above-mentioned manner, the right and left positions of the location adjusting guide 37, i.e., the positions thereof along the direction perpendicular to the conveyance direction of the bags, can be freely adjusted within a predetermined range. This is because the location adjusting guide 37 is fixed using the elongated holes 35a and 37e.

The position-changing guide 40 includes a right-hand side position-changing guide 38. The guide 38 is disposed at the right-hand side when viewed from the upstream of the conveyance direction. The position-changing guide 40 also includes a left-hand side position-changing guide 39. The guide 39 is disposed at the left-hand side when viewed from the downstream of the conveyance direction. Each of the guides 38 and 39 includes, respectively, an inclined surface 38a or 39a, a first colliding surface 38b or 39b, a second colliding surface 38c or 39c, and brackets 38d and 38e or 39d and 39e. The inclined surface 38a or 39a is inclined so that it approaches near the inside of the line as it goes towards the downstream of conveyance direction of bags. The first colliding surface 38b or 39b extends, from the downward end of the inclined surface 38a or 39a, in a direction perpendicular to the conveyance direction of the bags. The second colliding surface 38c or 39c extends from the inner end portion of the first colliding surface 38b or 39b along the downstream side in the conveyance direction. That is, as shown in FIGS. 11 through 14, the first colliding surface 38b or 39b is in a vertical position relative to the second colliding surface 38c or 39c. The brackets 38d and 38e or 39d and 39e are provided to fix the inclined surface 38a or 39a, the first colliding surface 38b or 39b, and the second colliding surface 38c or 39c, in their standing states, to the supports 35 and 36. The brackets 38d and 38e or 39d and 39e extend upwardly from the inclined surface 38a or 39a or the second colliding surface 38c or 39c. The structure of the brackets 38d and 39d and that of the brackets 38e and 39e are the same as the structure of the above-mentioned bracket 37c and 37e. Also, the manner by which they are fixed to the front support 35 and the rear support 36 is also the same. Accordingly, the right and left positions of the right-hand side position changing guide 38 and the left-hand side position changing guide 39, i.e., the positions thereof along the direction perpendicular to the conveyance direction of the bags, can be freely adjusted within a predetermined range.

Figure 10:
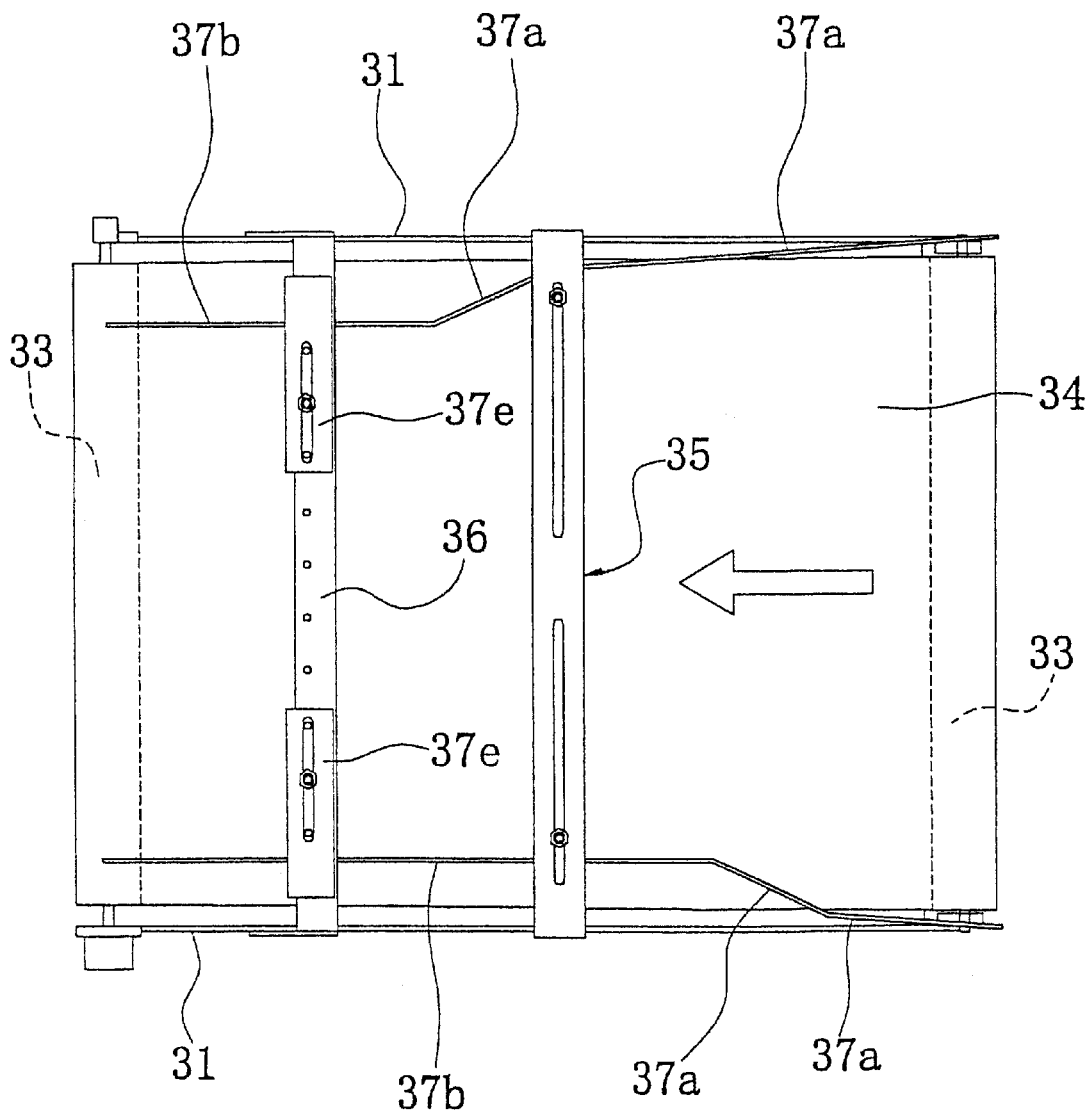
FIG. 10 is a plan view of the position-adjusting unit.
Figure 11:
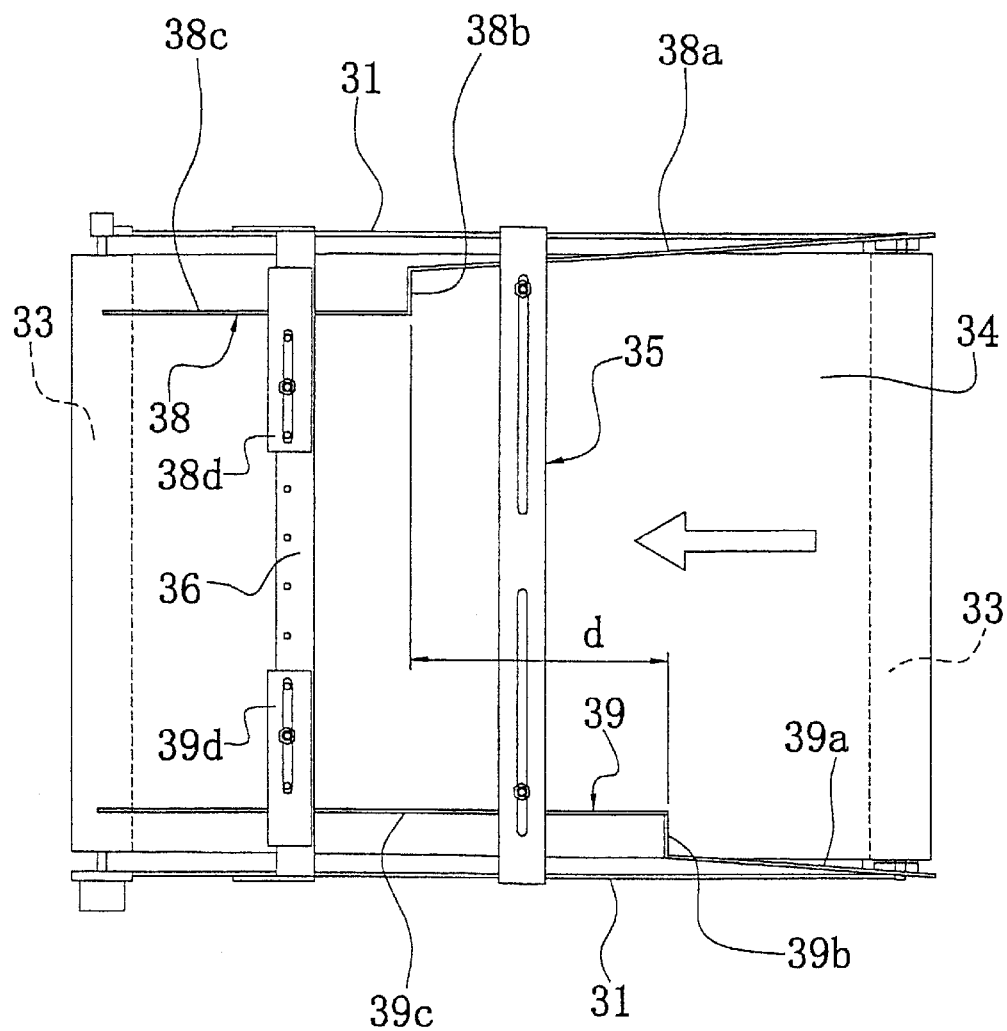
FIG. 11 is a plan view of the position-adjusting unit showing another embodiment.

FIG. 10 is a plan view showing the position-adjusting unit 3 in which the location-adjusting guide 37 is selectively attached. FIG. 11 is a plan view showing the position-adjusting unit 3 in which the right and left position-changing guides 38 and 39 are selectively attached.

As shown in FIG. 10, the inclined surface 37a of the location adjusting guide 37 includes two portions, each of which having a different inclined angle with respect to the conveyance direction (referring to the direction of white arrow.) Also, although it is not clear in the schematic perspective view of FIG. 9A, the position at which the inclined surface 37a crosses the non-inclined surface 37b is shifted in the conveyance direction between the one on the right-hand side and the one on the left-hand side as shown in FIG. 10. The right-hand and left-hand side positions, i.e., the positions along the direction perpendicular to the conveyance direction, of the bag conveyed on the flat belt 34 are adjusted by the guidance of the inclined surface 37a.

As shown in FIG. 11, when the right-hand and the left-hand side position changing guides 38 and 39 are used, the position of the first collision surface 38b of the right-hand side position changing guide 38 is shifted from the corresponding position of the first colliding surface 39b of the left-hand side position changing guide 39 in the conveyance direction. In this embodiment, the distance, d, shifted in the conveyance direction, is adjusted so that it becomes longer than the length of a conveyed bag.

Position-Adjusting Unit Operation When Using Position Changing Guide

When the position-changing guide 40, i.e., the right-hand and left-hand position-changing guides 38 and 39, is used, a position change of a bag by the first and the second colliding surfaces 38b, 39b, 38c, and 39c is conducted in addition to a location adjustment of a bag by the inclined surfaces 38a and 39a. The operation of the position change of a bag will be described with reference to FIGS. 12A–D and 13.

The bags P are conveyed in a line from the processed bagging machine used in a previous process of the packing system 1 in a state having sealed portions at their front and end. The bags P are then directed in two directions by the directing unit 2. Further, the bags P are conveyed to the first colliding surfaces 38b and 39b by the flat belt 34. This happens while the bags P are being guided on their sides by the inclined surfaces 38a or 39a of the position-adjusting unit 3 (referring to FIG. 12A).

Figure 13:
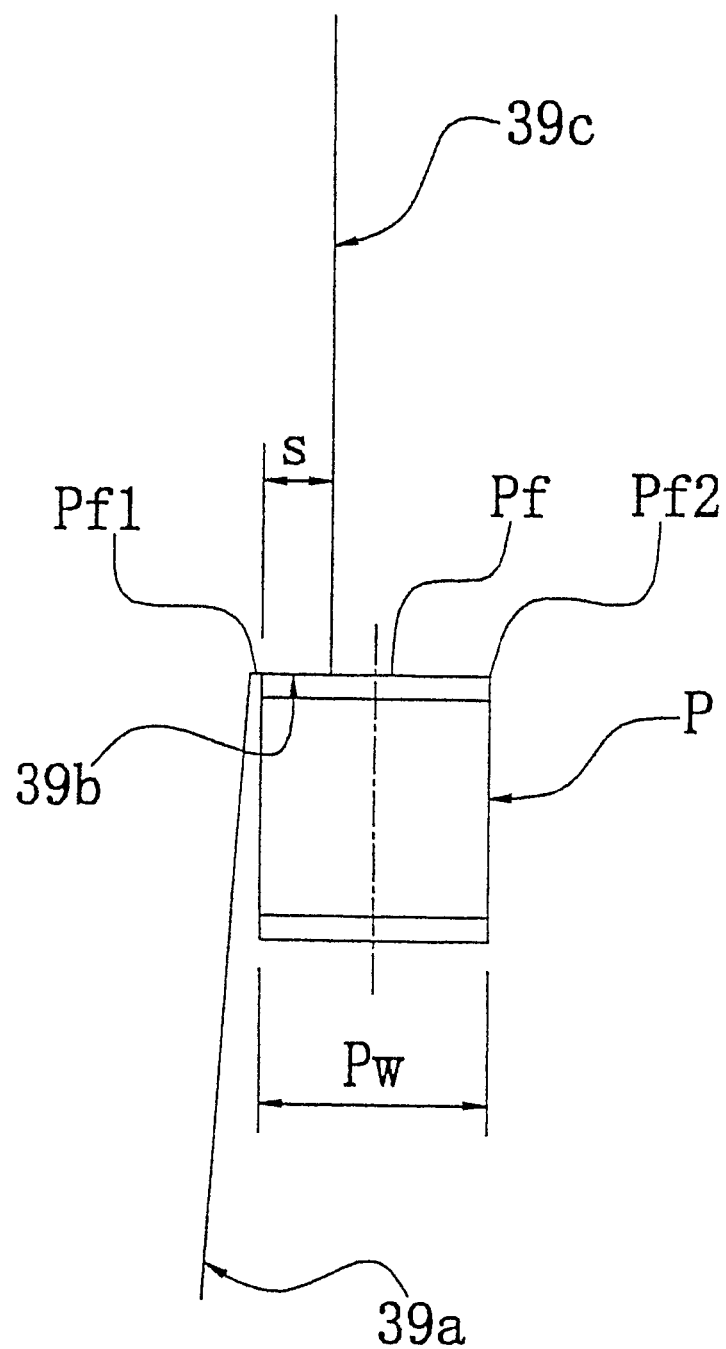
FIG. 13 is a correlation diagram depicting a guide and a bag during collision.

In the state shown in FIG. 12A, each of the bags P collides against the first colliding surfaces 38b or 39b. FIG. 13 shows the correlation of the first colliding surface 39b and the bag P at the time of collision. The bag P has a width Pw. The front portion of the bag P is indicated by Pf. The width of a part of the front portion Pf of a Pf1 side of the bag P makes contact with the first colliding surface 39b. This width is indicated by s. In cases where the weight distribution of the bag P is uniform, if the size ratio (s/Pw) is set to be less than 0.5, the position of the bag P is changed 90 degrees in almost all cases as described later. However, taking into account the characteristics of the bag P and the stability of the position change, it is desired to set the size ratio s/Pw between 1/4 and 1/3. The characteristics of a bag P depend on materials and the size of the bag P and articles contained in the bag P. In order to perform assuredly the position change of a bag P, it is article practice to set a relatively large size ratio (s/Pw) for soft bags and a relatively small size ratio (s/pw) for hard bags. If the weight distribution of the bag P is not uniform, the position of the bag P can be changed 90 degrees in a desired state if the size ratio (s/Pw) is smaller than 1.0.

As shown in FIG. 12A, the bag P is conveyed by the flat belt 34. The bag hits the first colliding surface 38b or 39b. A force towards the downstream of the conveyance direction by the flat belt 34 and a reaction force by the first colliding surface 38b or 39b are applied to the bag P. Accordingly, the bag P rotates, with a rotation center being a proximity to the position where the first colliding surface 38b or 39b meets the second colliding surface 38c or 39c, as shown in FIG. 12B.

As the bag P keeps rotating, the other end Pf2 (also indicated in FIG. 13) of the front portion Pf of the bag P makes contact with the second colliding surface 38c or 39c as shown in FIG. 12C. A reaction force by the second colliding surface 38c or 39c is applied to the bag P. The reaction force stops the rotation of the bag P when the bag P is rotated about 90 degrees. Further, as shown in FIG. 12D, the bag P is conveyed to the conveyance adjusting conveyer 4 by the flat belt 34 in a state its sealed portions being on their sides.

Present Invention Position-Adjusting Unit Characteristics

In the position-adjusting unit 3, the right-hand and the left-hand side position changing guides 38 and 39 are used. Thus, the position of the bag P can be changed by 90 degrees using a simple method in which the two colliding surfaces (the first colliding surfaces 38b and 39b and the second colliding surfaces 38c and 39c) are utilized. Accordingly, there is no need to conduct time-consuming and complicated processes such as to hold a bag or move the bag while holding the bag and, hence, the speed for changing the position of the bag P is increased. In addition, there is no need to temporarily stop the flat belt 34 for conveying the bag P. Moreover, the conveyance of the bag P by the flat belt 34 is utilized for changing the position of the bag P. Thus, it becomes possible to perform the position changing operation of the bag P using a simple structure without decreasing the conveyance speed of the bag P by the flat belt 34.

Figure 14A:
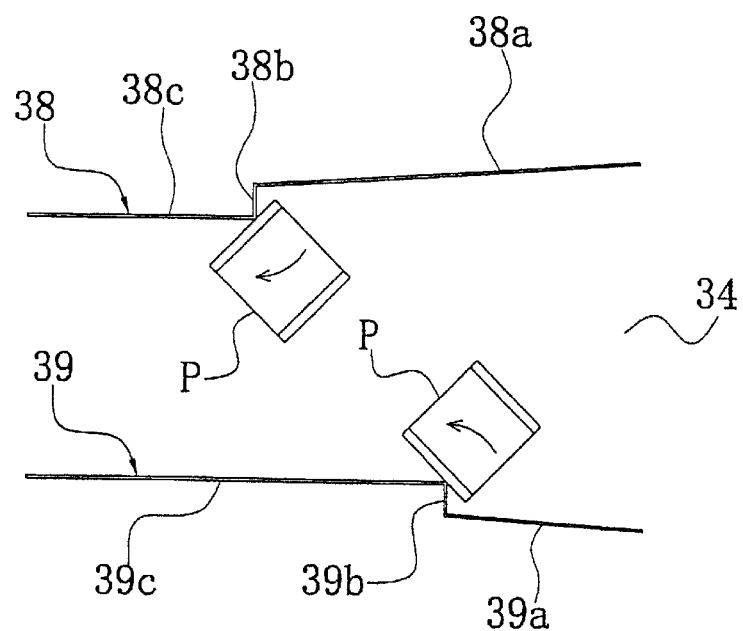
FIGS. 14A and 14B are plan view diagrams for bag position change comparison based on the position of right and left first-colliding surfaces.
Figure 14B:
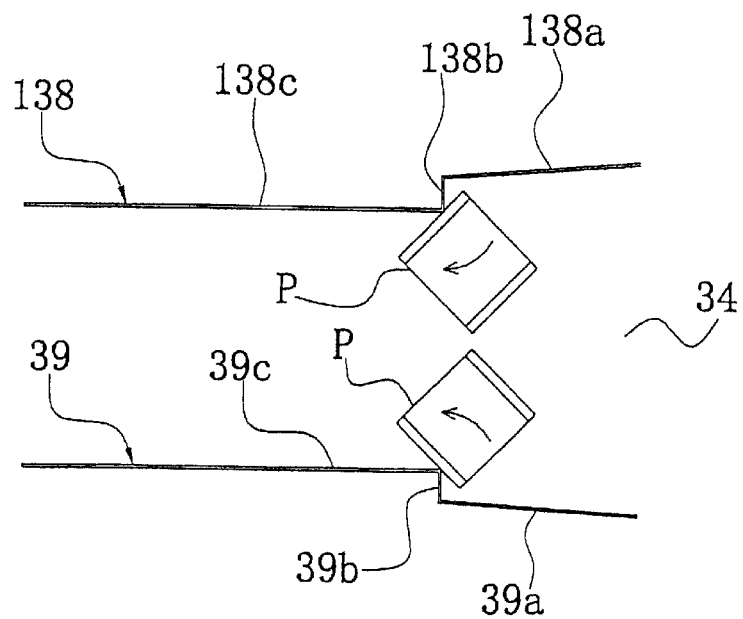

Further, the position of the first colliding surface 38b of the right-hand side position changing guide 38 is shifted from the position of the first colliding surface 39b of the left-hand side position changing guide 39 in the conveyance direction in this embodiment. Thus, the bags P, after being directed in two directions by the directing unit 2, in the right-hand line do not interfere with ones in the left-hand line when they are rotated. That is, as shown in FIG. 14A, the position of the first colliding surface 38b makes contact with the bag P in the right-hand side line is shifted from the position of the first colliding surface 39b. The first colliding surface 39b makes contact with the bag P in the left-hand line in the conveyance direction in this embodiment. Thus, there is no danger that bags P in both lines collide against each other when their positions are changed. As shown in FIG. 14B, in contrast, the position of a first colliding surface 138b of a right-hand side position changing guide 138 makes contact with the bag P on the right-hand side line. The first colliding surface 39b also makes contact with another bag P on the left-hand line. Since the surfaces 138b and 39b are not shifted, the possibility that the bags P in both lines can collide against each other during the position change is increased. This point in which the interference of bags can be avoided is also one of the characteristics of the position-adjusting unit.

Conveyance-Adjusting Conveyer

As shown in FIG. 1, the conveyance-adjusting conveyer includes flat belt conveyers 41 and 42. Each conveyer is driven by an independent motor (not shown) and is controlled by a controller (not shown). The conveyance-adjusting conveyer has a function of adjusting timing of transferring the bags P to the packing unit 5, which will be described later.

Packing Unit

Figure 15:
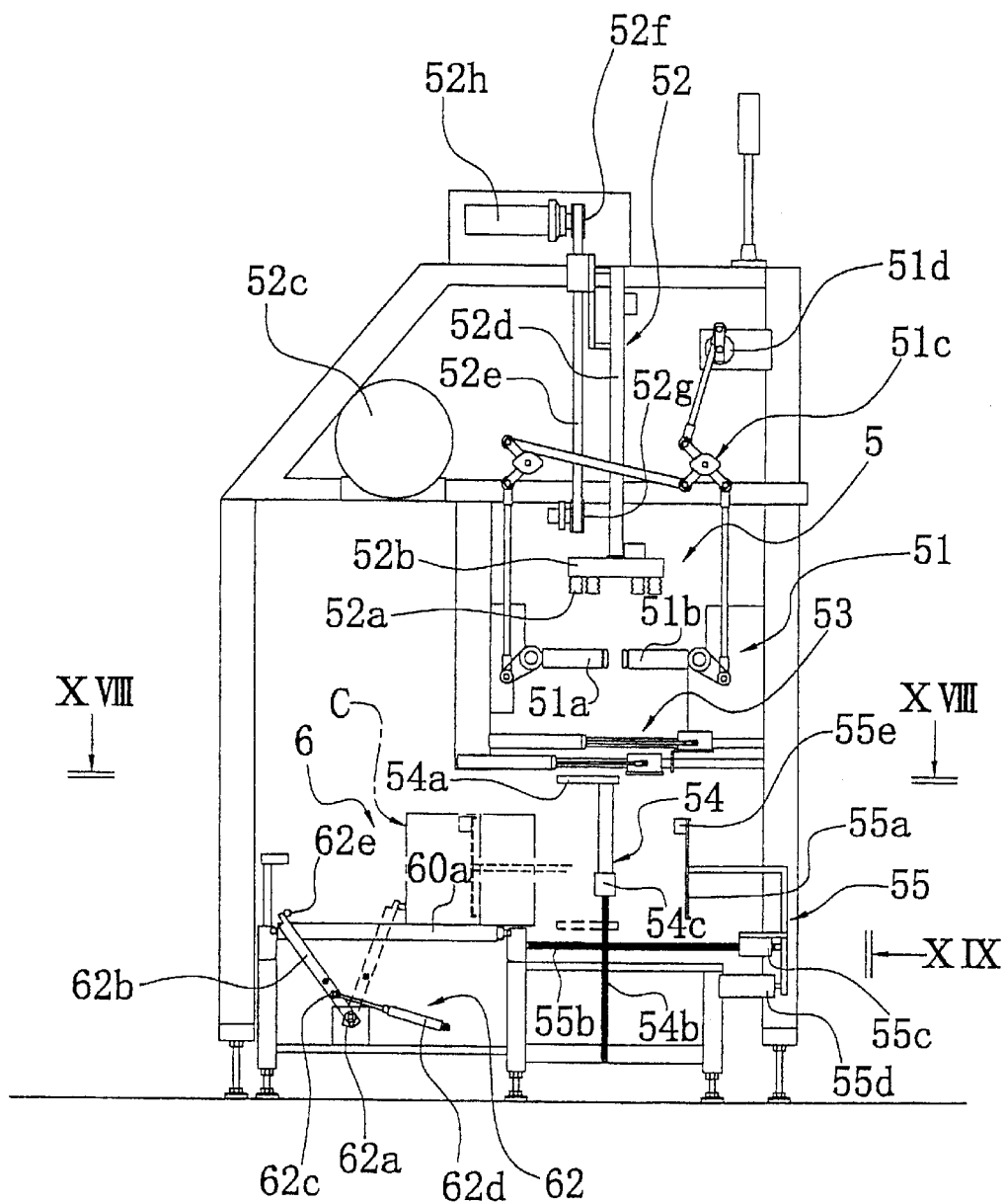
FIG. 15 is a back view of a packing unit and a cardboard-box-transferring unit.

FIG. 15 is a diagram showing the packing unit 5 viewed from the backside thereof. As shown in FIGS. 1 and 16, the packing unit 5 mainly includes a pair of bag aligning conveyer units 51, a stacking device, and a pushing device 55. The pair of bag aligning conveyer units 51 aligns bags, which are conveyed in two lines. The stacking device stacks the bags, which have been aligned on the bag aligning conveyer units 51 in two lines, in a plurality of layers in one line. The pushing device pushes the stacked bags in a cardboard box C. Also, controlling devices 59 (referring to FIG. 20) control these units and devices.

Bag-Aligning Conveyer Unit Structure

As shown in FIG. 15, the bag-aligning conveyer unit 51 includes mainly a pair of conveyers 51a and 51b, corresponding conveyer motors 51e and 51f (referring to FIG. 20), a link mechanism 51c, and a motor 51d. The link mechanism 51c changes the position of the conveyers 51a and 51b by 90 degrees. The motor 51d rotates the upper end portion of the link mechanism.

Each of the pair of conveyers 51a and 51b aligns bags on its upper surface by receiving bags conveyed from the conveyance adjusting conveyer 4 and conveying them intermittently. For instance, three bags can be aligned on each of the conveyers 51a and 51b without any space between the bags (referring to FIG. 1).

In addition, the position of each of the conveyers 51a and 51b can be changed from a horizontal state to a vertical state by using the link mechanism 51c. The motor 51d drives the link mechanism 51c. Therein, the conveyers 51a and 51b in their horizontal states are moved from a position (herein after referred to as a transferring route). The transferring route is formed by a space connecting vacuum portions 52a (to be described later) with an elevator 54a and a first slider 53a located above/below the conveyers 51a and 51b.

Stacking Device Structure

The stacking device includes a vacuum type transferring device 52, a sliding device 53, and an elevator device 54. The transferring device 52 holds the bags by suction. The bags have been arranged in two lines on the conveyers 51a and 51b of the bag aligning conveyer unit 51. The bags are transferred onto the sliding device 53 disposed below.

The transferring device 52 mainly includes the vacuum portions 52a, a vacuum stand 52b, a vacuum pump 52c, a rod 52d, a vertical motion belt 52e, a pair of up and down pulleys 52f and 52g, and a motor 52h. The vacuum portion 52a makes contact with the bags on the conveyers 51a and 51b and holds them by suction. The motor 52h rotates one of the pulleys, i.e., 52f.

The vacuum stand 52b is disposed above the conveyers 51a and 51b and has a hollowed inside. The plurality of vacuum portions 52a, each of which extends in the lower direction, is connected to the lower surface of the vacuum stand 52b. Each vacuum portion 52a is formed by a flexible cylindrical member having a bellows-like vertical cross section. The vacuum portion 52a can be made by a rubber or resin. Further, the vacuum stand 52b is connected to the vacuum pump 52c by a hose (not shown). The hose extends from the upper surface of the vacuum stand 52b so that the inside of the vacuum stand 52b can be exhausted when commanded by the controlling device 59 (referring to FIG. 20) of the packing unit 5. Thus, the pressure inside the vacuum portion 52a also becomes negative. Further, if the lower end of the vacuum portion 52a makes contact with a bag, the vacuum portion 52a holds the bag by suction.

The lower end of the rod 52d is fixed to the vacuum stand 52b and its upper end is fixed to the vertical motion belt 52e. When the motor 52h rotates the pulley 52f, the vertical motion belt 52e connecting the pulleys 52f and 52g is moved upwardly or downwardly. Hence, the rod 52d fixed to the belt 52e is also moved accordingly. The direction and the distance of the movement is controlled by the controlling device 59 of the packing unit 5 which manages the drive of the motor 52h. The vacuum portion 52a is also moved upwardly or downwardly in accordance with the movement of the rod 52d.

Sliding Device 53 Structure

Figure 16A:
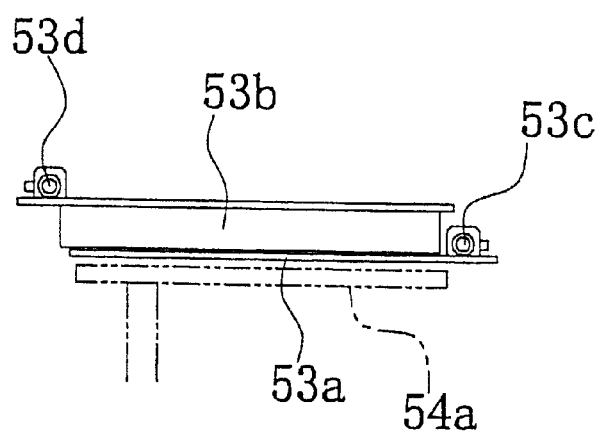
FIGS. 16A and 16B are views depicting a side and the rear of a sliding device.
Figure 16B:
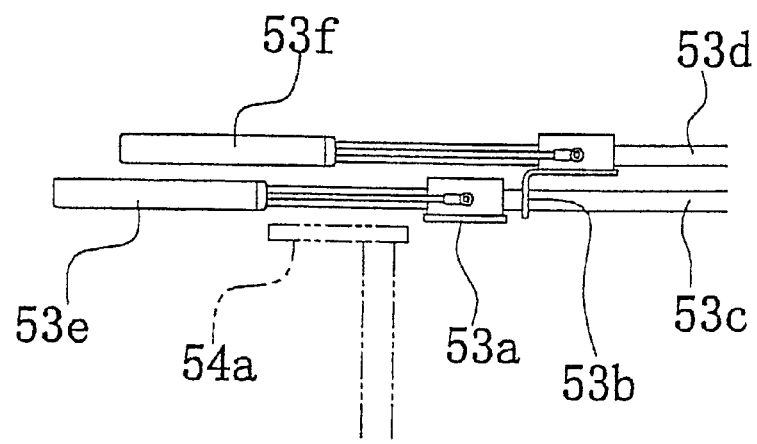

As shown in FIG. 15, the sliding device 53 is disposed below the conveyers 51a and 51b in the horizontal state. FIGS. 16A and 16B are diagrams showing a side view and a rear view of the sliding device 53. The sliding device 53 mainly includes the first slider 53a, a second slider 53b, two rods 53c and 53d extending in a horizontal direction, and two air cylinders 53e and 53f.

The first slider 53a is a plate member which is horizontally disposed directly below the bags arranged on the conveyer 51b. The first slider 53a is supported by the rod 53c via a thrust bearing so that it can move in the horizontal direction along the rod 53c. The first slider 53a can be moved in the horizontal direction by the air cylinder 53e.

The second slider 53b is a plate member having a vertical surface. The second slider 53b makes contact with a side surface of the bag mounted on the first slider 53a at the other way of the first slider 53a. The upper end of the vertical surface of the second slider 53b is located at a position higher than the first slider 53a so that it is capable of making contact with a bag on the first slider 53a. The second slider 53b is supported by the rod 53d via a thrust bearing. Thus, the second slider 53b can move in the horizontal direction along the rod 53d. The second slider 53b can be moved in the horizontal direction by the air cylinder 53f.

Figure 20:
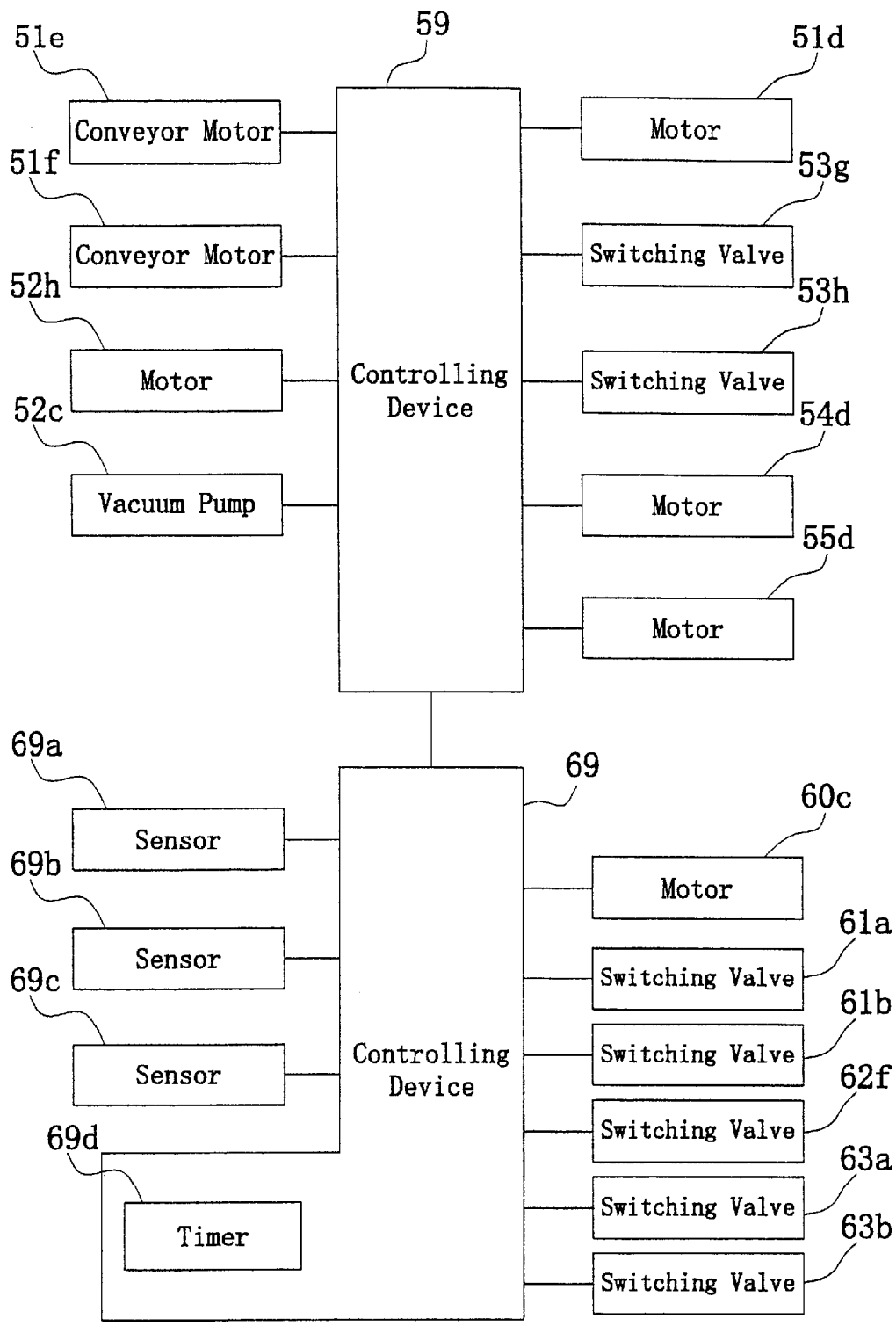
FIG. 20 is a block diagram of controlling devices for the packing unit and the cardboard box-transferring unit.

In addition, referring to FIG. 20, the control of switching valves 53g and 53h which are capable of switching the air supply to the air cylinders 53e and 53f is also carried out by the controlling device 59 of the packing unit 5.

Elevator Device 54 Structure

As shown in FIGS. 1, 15, 17, and 18, the elevator device 54 includes the elevator 54a, and an electrically driven ball screw mechanism. The electrically driven ball screw mechanism includes a vertical rod 54b, a motor 54d, and a circular cylinder member 54c that is engaged with the vertical rod 54b. A male screw is formed vertical rod 54b. The motor 54d rotates the vertical rod 54b. The circular cylinder member 54c is engaged with the vertical rod 54b. The electrically driven ball screw mechanism moves the elevator 54a in an up-and-down direction. The elevator 54a is fixed to a circular cylindrical member 55c via an L-shape support. This movement in the up-and-down direction is also controlled by the controlling device 59 of the packing unit 5, which controls the drive of the motor 54d.

Figure 17:
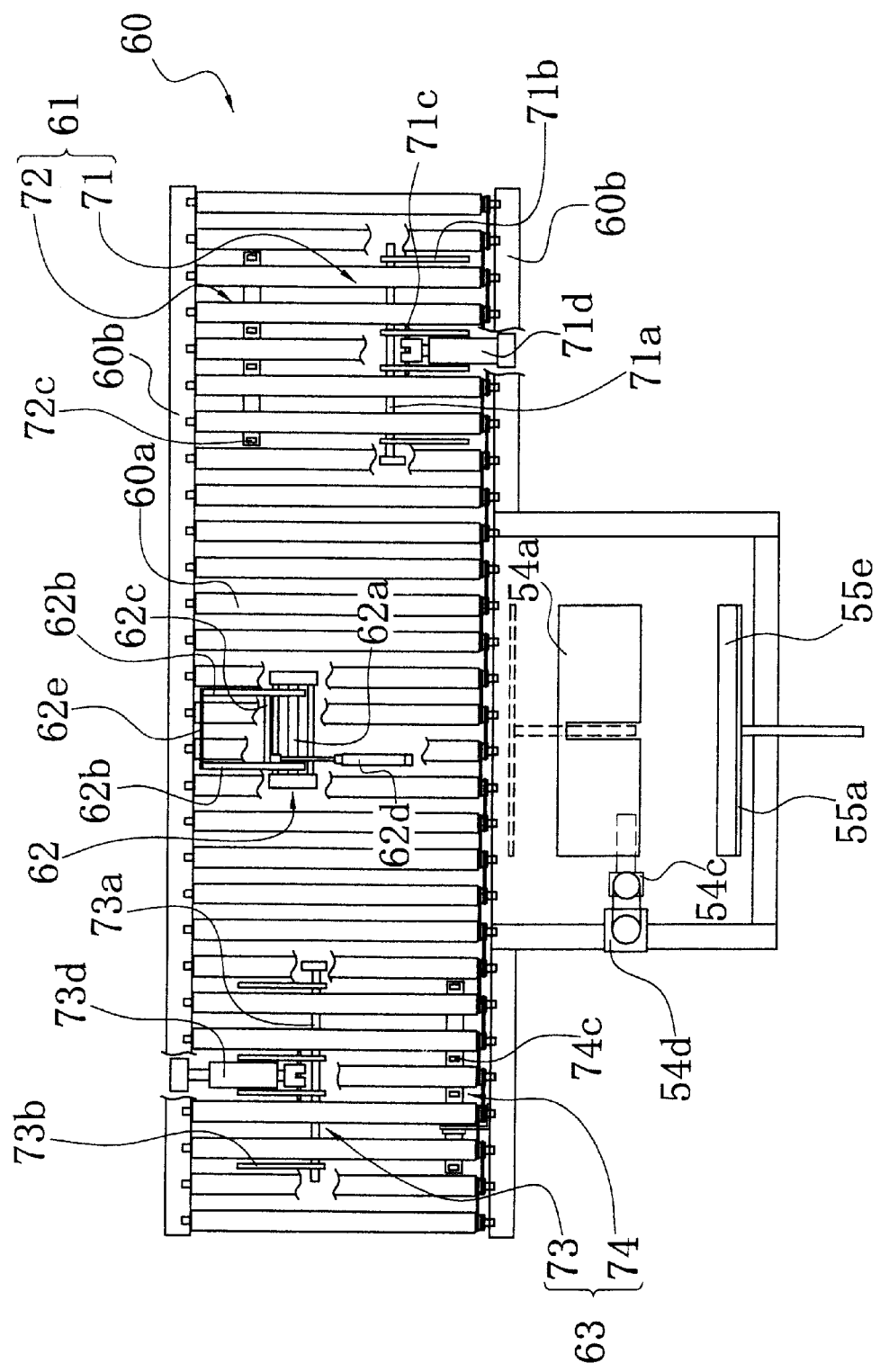
FIG. 17 is a view seen in the direction of arrows XVIII—XVIII in FIG. 15.

As shown in FIG. 15, the elevator 54a is a plate member that is horizontally disposed directly below the bags arranged on the conveyer 51a. As shown in FIG. 17, the elevator 54a has a cut-out center portion so that interference with a U-shape support member supporting a pusher 55a of the pushing device 55 (to be described later) can be avoided. Also, as shown in FIGS. 16A and 16B, the position of the elevator 54a is predetermined so that when located at its highest elevated position, the elevator is still lower than the position of the lower surface of the first slider 53a.

Pushing Device Structure

Figure 18:
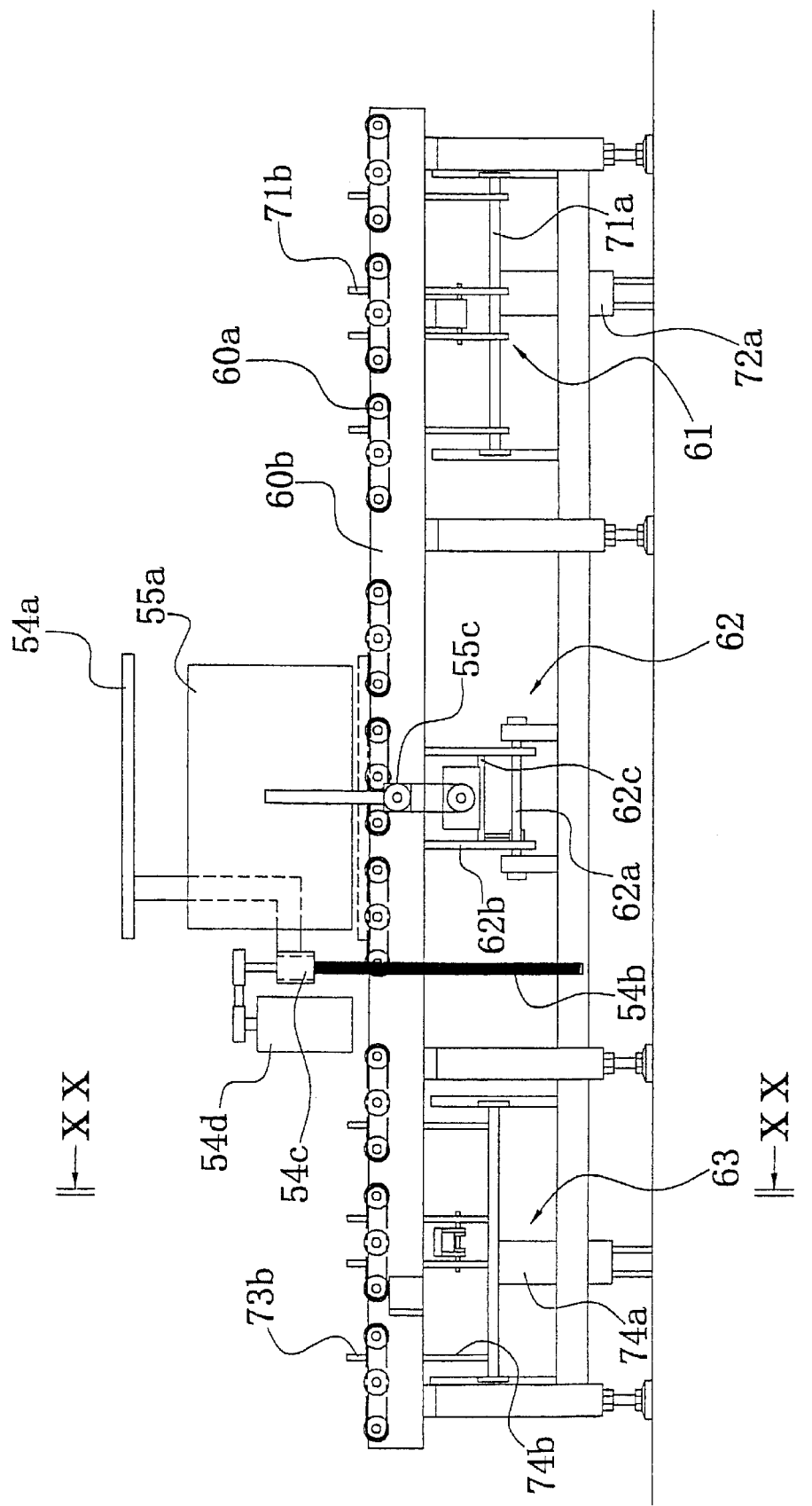
FIG. 18 is a view seen in the direction of arrows XIX—XIX in FIG. 15.

As shown in FIGS. 15 and 18, the pushing device 55 includes the pusher 55a and an electrically driven ball screw mechanism. The electrically driven ball screw mechanism reciprocates the pusher 55a in the horizontal direction. The electrically driven ball screw mechanism includes a horizontal rod 55b on which a male screw is formed, a motor 55d for rotating the horizontal rod 55b, and a circular cylinder member 55c which is engaged with the horizontal rod 55b. The electrically driven ball screw mechanism moves the pusher 55a, which is fixed to the circular cylindrical member 55c via the U-shape support member in the horizontal direction. This movement of the pusher 55a is also controlled by the controlling device 59 of the packing unit 5, which controls the drive of the motor 55d.

The pusher 55a has a vertical contacting surface (the left-hand side surface of the pusher 55a in FIG. 15). The vertical contacting surface makes contact with bags stacked in one line on the elevator 54a from the side direction thereof. The width of the vertical contacting surface is substantially the same as the length in the longitudinal direction (i.e., a longer side) of the elevator 54a. Also, the height of the pusher 55a is predetermined to be a little shorter than the width W (referring to FIG. 24) of the cardboard box C.

Figure 28A:
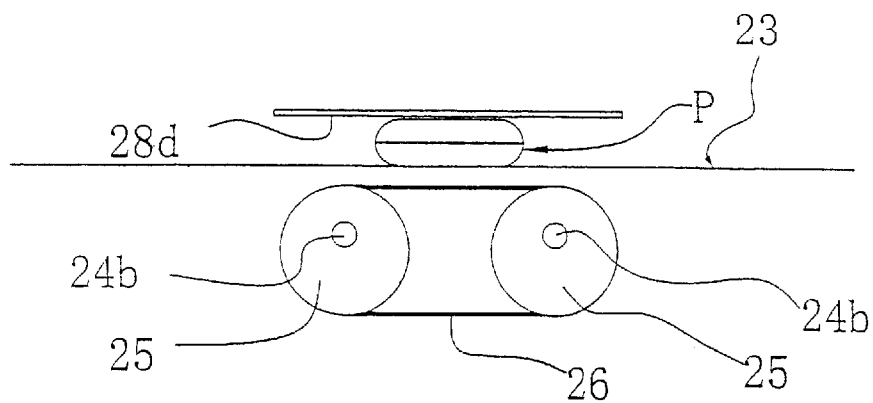
FIGS. 28A–C are diagrams depicting, in elevational section, operation of a directing unit in another embodiment.
Figure 28B:
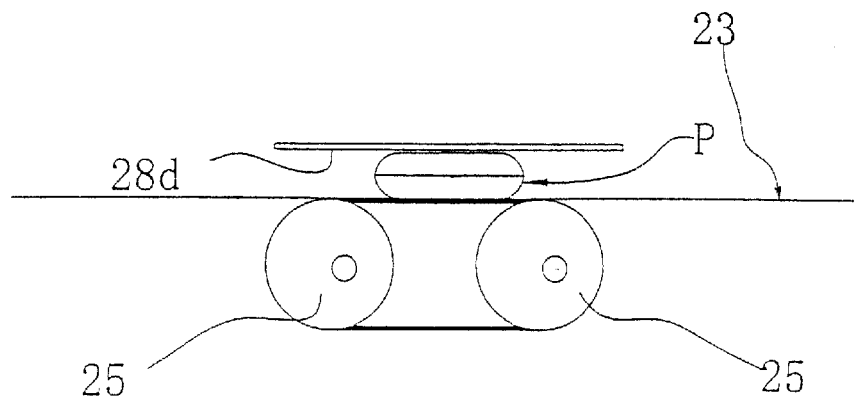

In addition, as shown in FIGS. 15 and 28A, an protruding member 55e protruding in the cardboard box-transferring unit 6 side (i.e., the left hand side in FIG. 15) is attached to the upper portion of the vertical contacting surface of the pusher 55a. The protruding member 55e has a length that is equal to the width of the pusher 55a as shown in FIG. 17.

Packing Unit Operation

In the packing unit 5, bags arranged on the conveyers 51a and 51b in two lines are stacked in one line by the stacking device and the bags are pushed in the cardboard box C on the cardboard box-transferring unit 6. This operation will be described in detail.

The bags conveyed from the conveyance adjusting conveyer 4 in two lines are aligned on the conveyers 51a and 51b by the intermittent conveyance of the conveyers 51a and 51b of the bag aligning conveyer unit 51.

When, for instance, three bags are arranged on each of the conveyers 51a and 51b (i.e., six bags in total), the six bags are held by suction by the vacuum portions 52a. As the bags are held by suction, the controlling device 59 drives the motor 51d so that the conveyers 51a and 51b are moved away from the transferring route by the link mechanism 51c. At that time, conveyance of the bags to the bag aligning conveyer unit 51 is suspended by using the conveyance adjusting function of the conveyance adjusting conveyer 4.

After the conveyers 51a and 51b are moved away from the transferring route, the controller drives the motor 52h to lower the vacuum portions 52a so that the bags can be placed on the elevator 54a and the first slider 53a. The suction is then released. After that the controller moves the vacuum portions 52a upwardly and returns the conveyers 51a and 51b in the horizontal direction. Note that although not shown in the figures, the controlling device 59 of the packing unit 5 also exchanges signals with a controlling device (or controller) of each unit. The controlling device of each unit is located upstream of the conveyance direction of the packing unit 5 such as the conveyance-adjusting conveyer 4. Thus, the positions of the conveyers 51a and 51b can be coupled to the movement of the conveyance-adjusting conveyer 4. Also, if some bags have already been stacked on the elevator 54a, the vacuum portions 52a applies a light force to the bags on the elevator 54a by using flexibility thereof.

In this way, a total of six bags in two lines are placed on the elevator 54a and the first slider 53a. These bags are stacked on the elevator 54a before the transferring device 52 conveys the next six bags in two lines. This stacking operation will be described with reference to FIGS. 21A–21N and FIGS. 22A–22J.

Figure 21A:
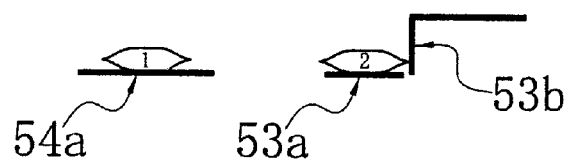
FIGS. 21A–21N are stacking device operational diagrams.

First, as shown in FIG. 21A, when the bags are placed, the elevator 54a is located at its highest position. The bags in two lines are placed on the elevator 54a and the first slider 53a as shown in the figure.

Figure 21B:
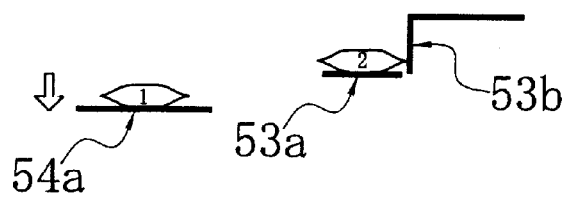
Figure 21C:
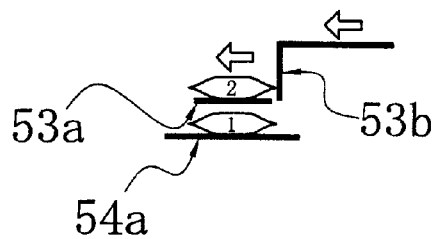
Figure 21D:
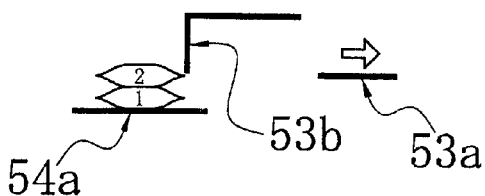

Then, the elevator 54a is lowered as shown in FIG. 21B. The first slider 53a and the second slider 53b are moved towards the elevator 54a until they reach the region above the elevator 54a as shown in FIG. 21C. only the first slider 53a is returned to its original position as shown in FIG. 21C. The bags carried on the first slider 53a falls onto the bags on the elevator 54a since one side of each of the bags is prevented from moving by the second slider 53b. That is, the bags are stacked. Then, as shown in FIG. 21D, the second slider 53b is also returned to the original position in order to wait for the next six bags conveyed in two lines by the transferring device 52.

Figure 21E:
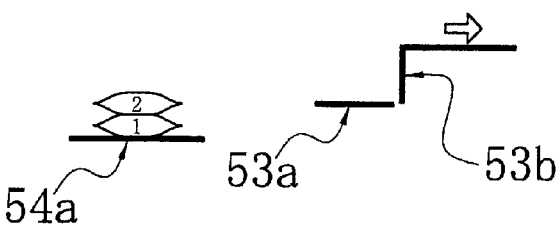
Figure 21F:
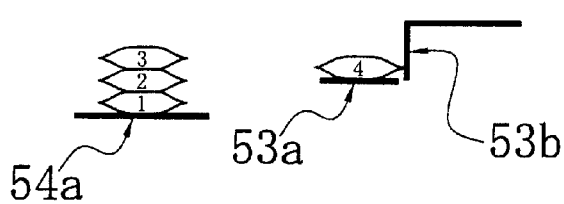
Figure 21G:
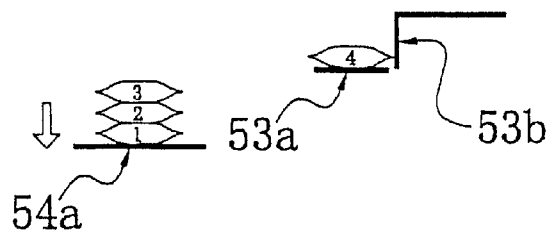
Figure 21H:
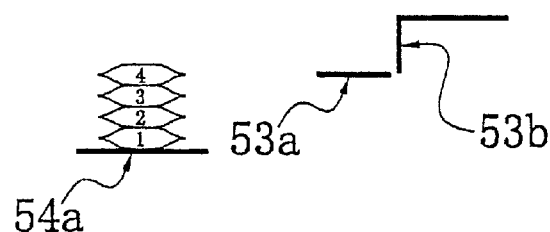

As shown in FIG. 21E, when the next six bags in two lines are placed on the elevator 54a and the first slider 53a, the elevator 54a is again lowered as shown in FIG. 21G. Then, as shown in FIG. 21H, the bags on the first slider 53a are stacked on the bags on the elevator 54a by the operations of the first slider 53a and the second slider 53b.

Then, when the next six bags in two lines are placed on the elevator 54a and the first slider 53a as shown in FIG. 21I, the elevator is again lowered as shown in FIG. 21G. The bags on the first slider 53a are stacked on the bags on the elevator 54a by the operations of the first slider 53a and the second slider 53b as shown in FIG. 21K.

Figure 21I:
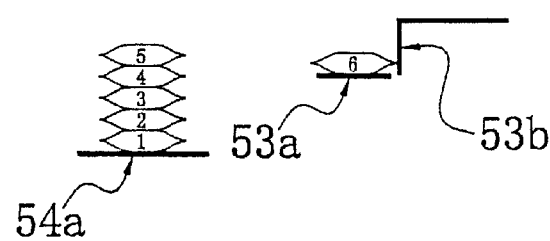
Figure 21J:
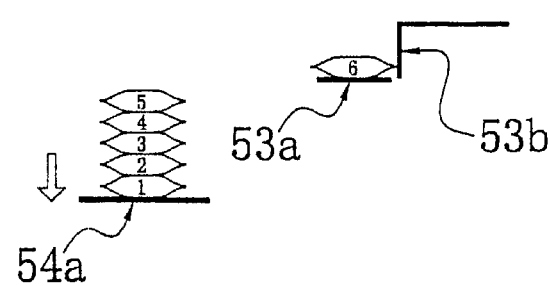
Figure 21K:
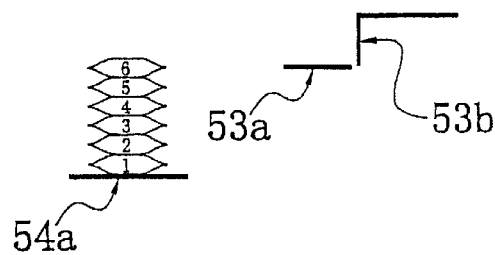
Figure 21L:
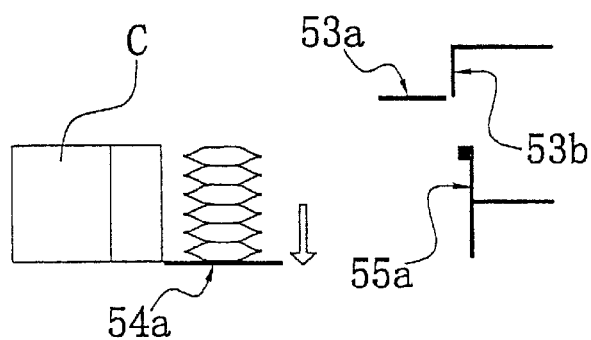
Figure 21M:
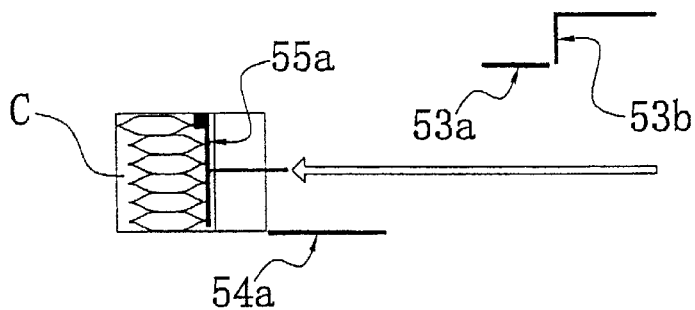

When the bags are stacked in one line with a plurality of layers in this manner, the elevator 54a is lowered to its lowest position as shown in FIG. 21L. Then, as shown in FIG. 21M, the pusher 55a pushes the six layers of bags arranged in one line (a total of 18 bags) on the elevator 54a into the cardboard box C which has been set by a box setting device 62 (to be described later). Finally, when the pusher 55a is returned to its original position as shown in FIG. 21N, the elevator 54a is immediately raised to the highest position and waits for the next six bags to be conveyed in two lines.

Figure 21N:
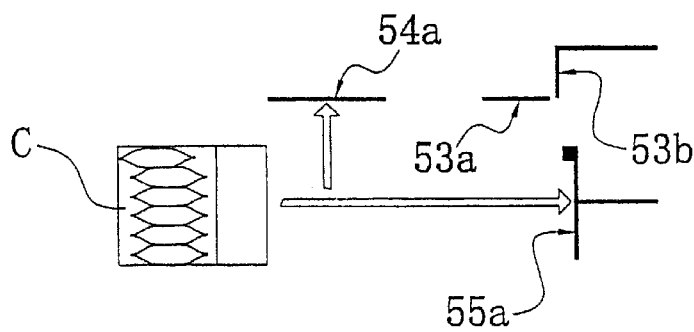

The above-mentioned operations described in FIGS. 21A through 21N are repeated so that the six layered bags in one line are successively put in the cardboard box C.

Packing Unit Characteristics

In the packing unit 5, a force is gently applied to the bags stacked on the elevator 54a from the top thereof by using the flexibility of the vacuum portions 52a. For this reason, if the height of a bag is increased due to such factors as deformation, it is returned to a normal state. Thus, problems such as bags arranged in a plurality of layers in one line not being pushed in the cardboard box C by the pusher 55a hardly occurs.

Referring to FIG. 15, in the packing unit 5, the conveyers Sa and 51b are moved away from the transferring route by the transferring device 52 when bags are transferred from the conveyers 51a and 51b onto the elevator 54a and the first slider 53a. For this reason, the transferring device 52 can be moved in the downward direction by taking the shortest route to perform the transferring operation and, hence, time required for the operation of the transferring device 52 can be reduced.

Figure 23A:
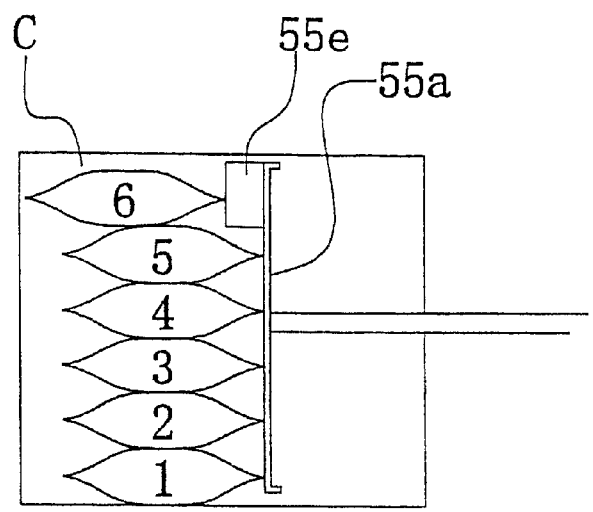
FIGS. 23A–23C are elevational views depicting a comparison of packing states of bags in a cardboard box.
Figure 23B:
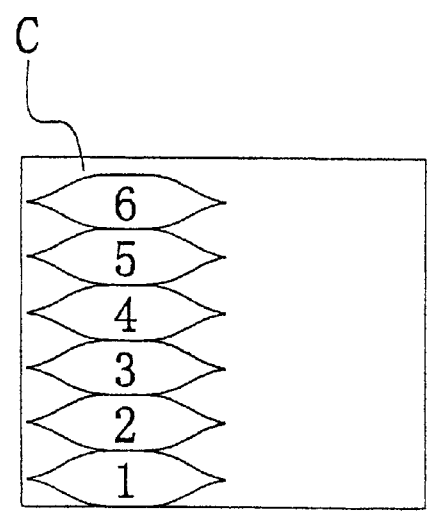
Figure 23C:
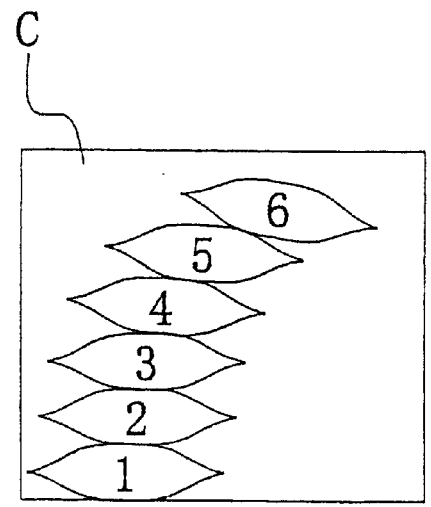

Moreover, in the packing unit 5 of the present invention, as shown in FIG. 23A, the bags arranged in six layers in one line are pushed in the cardboard box C. The bag placed at the top is pushed more towards the inside of the box compared with the other bags placed below by the protruding member 55e of the pusher 55a. In this manner, problems such as the bags falling as shown in FIG. 23C which can be caused when the bags are pushed in the box C in the manner as shown in FIG. 23B can be avoided. That is, there is a danger that the bags can collapse as shown in FIG. 23C by vibrations generated when the pusher is returned to its original position or the cardboard box C is conveyed. However, such a danger can be avoided since the bag located at the top is further pushed inside the box C as compared with the bags located underneath thereof.

Cardboard-Box-Transferring Unit

FIG. 15 is a diagram showing the cardboard box-transferring unit 6 viewed from the backside thereof. FIG. 17 is a diagram showing the cardboard box-transferring unit 6 from the top. FIG. 18 is a diagram showing the transferring unit 6 from the side direction thereof. The cardboard box-transferring unit 6 includes, mainly, a box conveying device 60, a box-toppling device 61, a box setting device 62, and a box-raising device 63. Also, these devices are controlled by a controlling device 69 of the cardboard box-transferring unit 6 (referring to FIG. 20).

Figure 24:
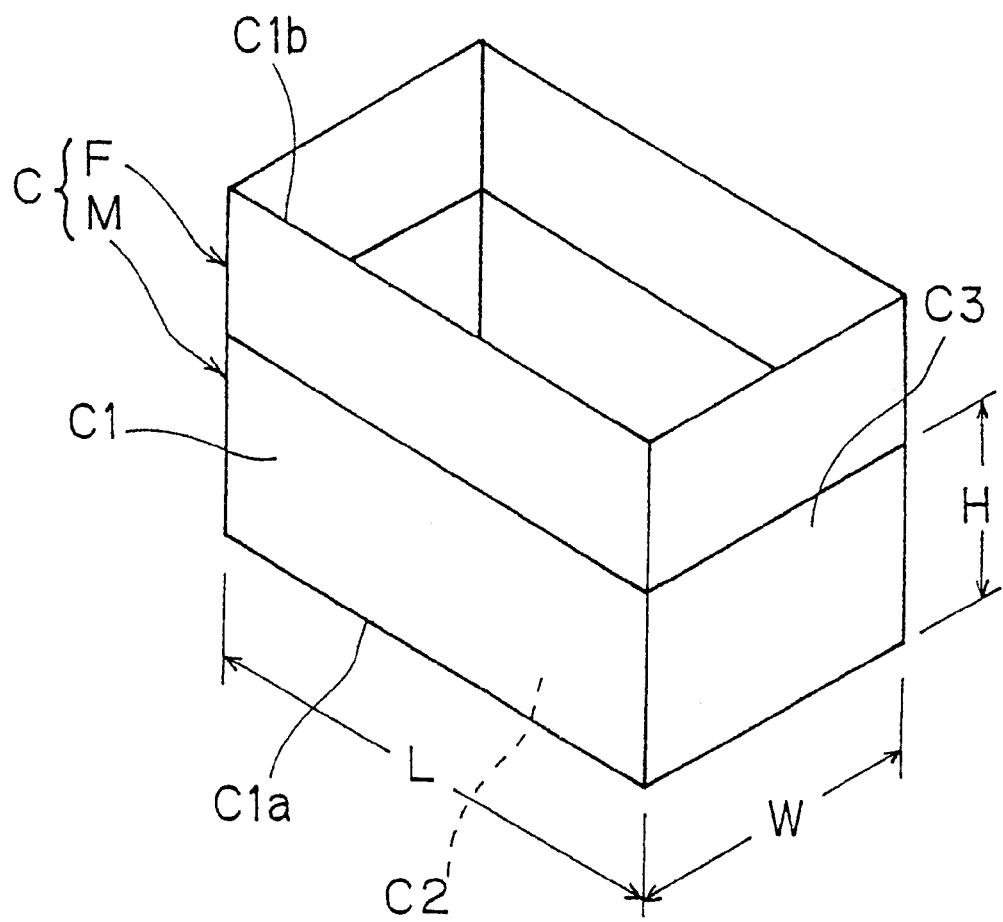
FIG. 24 is an oblique view of the outward appearance of a cardboard box.

A cardboard box C such as the one shown in FIG. 24 in its upright state is conveyed from an automated box constructing device (not shown in the figure), to the cardboard box-transferring unit 6. The automated box constructing device (not shown in the figure) constructs the box C and automatically tapes the bottom. The cardboard box C has a first surface C1, a second surface, and a third surface C3. The first surface C1 forms a side surface of the box C that extends lengthwise in the upright state of the box. The second surface C2 forms a bottom surface of the box C in the upright state. The third surface C3 forms a side surface of the box C that extends in the width direction in the upright state. In addition, the cardboard box C includes a main body M and a flap F. The first and the third surfaces C2 and C3 also include a part of the main body M and the flap F. The second surface includes the flap F which is taped by the automated box constructing device. The cardboard box C has a length L, a width W, and a height H.

Box-Conveying Device Structure

As seen in FIG. 17, the box conveying device 60 includes, mainly, a plurality of conveyance rollers 60a, frames 60b, and a motor 60c. Each roller 60a is disposed with a predetermined space between the other. Each frame 60b supports the respective end of each of the conveyance rollers 60a. The motor 60c rotates the conveyance rollers 60a as seen in FIG. 20. The box-conveying device 60 receives the cardboard box C from the automated box-constructing device (not shown). The box-conveying device 60 conveys the box C to the box-toppling device 61, the box setting device 62, and the box-raising device 63 in this order. Finally the box-conveying device 60 discharges the cardboard box C containing a plurality of bags to a cardboard box sealing device (not shown).

Three conveyance rollers 60a form a set by means of a belt and are rotated by the motor 60c. The conveyance rollers 60a are disposed at the same height so that the cardboard box C can be conveyed in the horizontal direction.

As shown in FIG. 20, three sensors 69a, 69b, and 69c are connected to the controlling device 69 so that signals from the sensors can be received by the controlling device 69. The sensor 69a detects the cardboard box C when the box C is conveyed to the box-toppling device 61 by the conveyance rollers 60a. The sensor 69b detects the cardboard box C when the box C is conveyed to the box setting device 62 by the conveyance rollers 60a. The sensor 69c detects the cardboard box C when the box C is conveyed to the box-raising device 63 by the conveyance rollers 60a.

The controlling device 69, when it receives a detection signal from the sensors 69a, 69b, or 69c, stops the rotation of the motor 60c temporarily and waits for the operation of the devices 61, 62, or 63, or the packing unit 5 to be completed. Afterwards the controlling device 69 restarts the motor 60c to convey the cardboard box to the next step.

Box-Toppling Device Structure and Operation

As seen in FIG. 17, the box-toppling device 61 includes a rod revolving mechanism 71 and a roller elevating mechanism 72. The rod revolving mechanism 71 includes a rod 71b, shafts 71a and 71c, and an air cylinder 71d. The roller elevating mechanism 72 includes an air cylinder 72a and a roller 72c. The structure of the box-toppling device 61 is substantially the same as that of the box-raising device 63 (to be described later). The device 61 differs only in its positioning (referring to FIG. 17) and the description thereof in detail will be omitted here.

Although the cardboard box C in the upright state is pushed down by the box-toppling device 61, the operation conducted by the device 61 is substantially the same as the one performed by the box rising device 63. The detail of the operation will be described later in the section of the box-raising device 63.

Box-Setting Device Structure

In the box setting device 62, portions other than the upper portion of the rod 62b and a circular rod 62e are disposed at positions lower than the conveyance rollers 60a. The box setting device 62 mainly includes two rods 62b, a shaft 62a to which the lower end of each rod 62b is fixed, a shaft 62c for connecting the middle portion of each rod 62b, and an air cylinder 62d for moving the shaft 62c. The two rods 62b are provided along the conveyance direction of the cardboard box C which is conveyed by the conveyance rollers 60a. The rods 62 are disposed between the conveyance rollers 60a (referring to FIG. 17). Also, the circular rod 62e is provided with the upper end of each of the rod 62b at the side which makes contact with the cardboard box C. The shaft 62a extends in the conveyance direction of the cardboard box C which is conveyed by the conveyance rollers 60a and the lower end of each of the rod 62b is fixed to the shaft 62a. The shaft 62c connects a middle portion (a little lower than its center) of each rod 62b and extends in the conveyance direction of the cardboard box C which is conveyed by the conveyance rollers 60a. As seen in FIG. 15, the air cylinder 62d rotates the rod 62b to a predetermined angle around the shaft 62a. The air cylinder 62d is supported in a rotatable manner. The shaft 62a acts as the rotation center. Switching on high-pressure air supplied by an air source, using a switching valve 62f moves the shaft 62c.

Box-Setting Device Operation

As seen in FIGS. 15 and 17, when the cardboard box C is pushed down by the box-toppling device 61. The box C is conveyed to a certain point of the box setting device 62 by the conveyance rollers 60a. The sensor 69b detects the box C and the controlling device 69 stops the conveyer.

After stopping the conveyance of the cardboard box C, the controlling device 69 actuates the air cylinder 62d to revolve the rod 62b and pushes the second surface C2 of the cardboard box in a pushed down state in substantially the horizontal direction by the circular rod 62e. Accordingly, the cardboard box C is horizontally moved along the length direction of the conveyance rollers 60a (i.e., the direction perpendicular to the conveyance direction by the conveyance rollers 60a), and placed at the position indicated by dotted lines in FIG. 15.

At this setting position of the box, bags arranged in a plurality of layers in one line on the elevator 54a can be pushed in the box C by using the pusher 55a. When the bags are packed in the cardboard box C located at the setting position, the controlling device 69 restarts the conveyance rollers 60a to convey the box C to the box-raising device 63.

Box-Raising Device Structure

Figure 19:
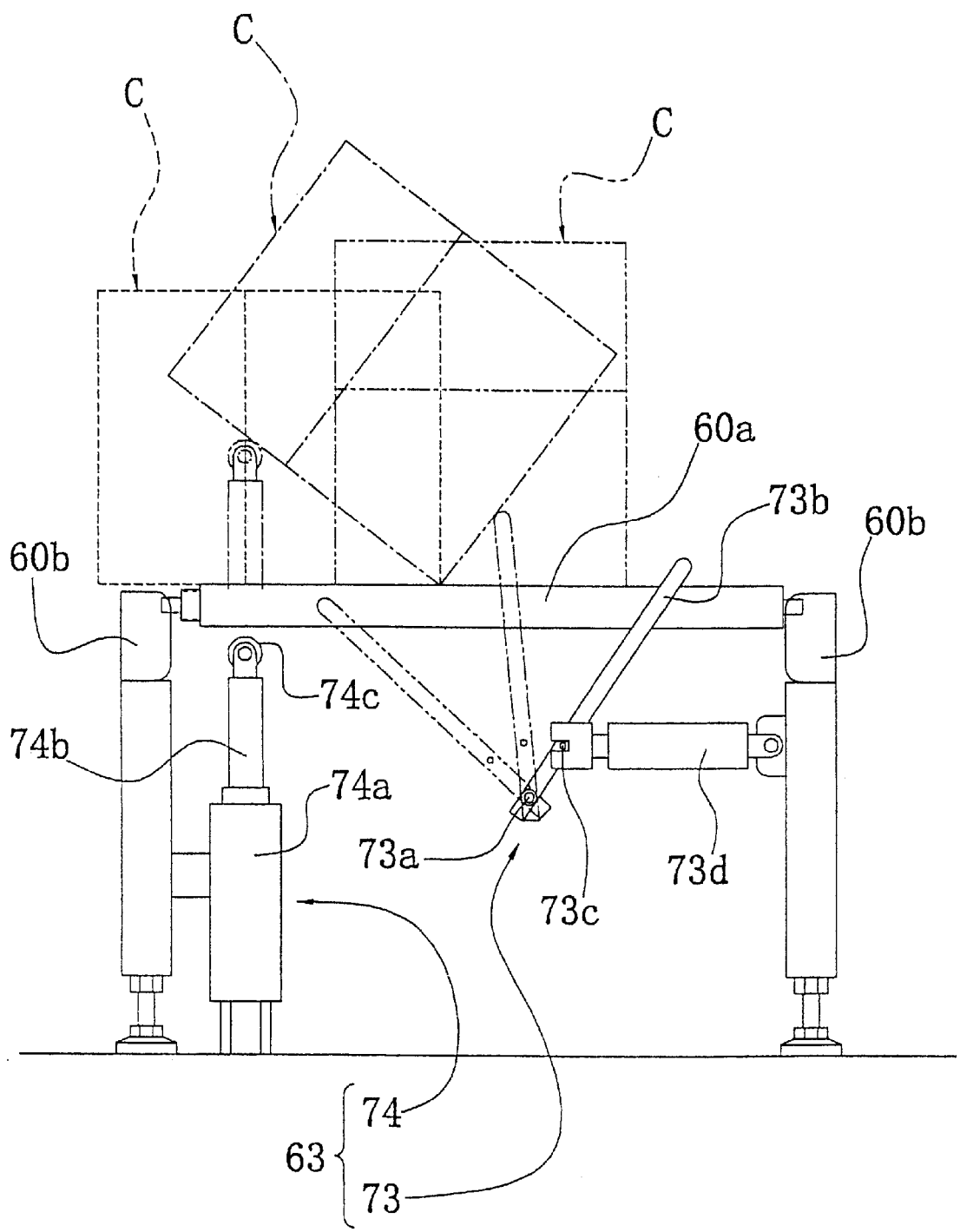
FIG. 19 is a view seen in the direction of arrows XX—XX in FIG. 18.

As shown in FIGS. 17 through 19, the box-raising device 63 mainly includes a rod revolving mechanism 73 and a roller elevating mechanism 74.

Rod-Revolving Mechanism 73 Structure

As seen in FIG. 19, in the rod revolving mechanism 73, portions other than rods 73b are disposed at positions lower than the conveyance rollers 60a. The rod revolving mechanism 73 mainly includes four rods 73b, a shaft 73a to which the lower end of each rod 73b is fixed, a shaft 73c for connecting the middle portion of two rods 73b located at the middle, and an air cylinder 73d for moving the shaft 73a. These four rods 73b are provided along the conveyance direction of the cardboard box C which is conveyed by the conveyance rollers 60a. The rods 73b are disposed between the conveyance rollers 60a. Also, the upper end of each of the rods 73b is smoothened as shown in FIG. 19 so that the cardboard box C can not be damaged by the rods 73b. The shaft 73a extends in the conveyance direction of the cardboard box C which is conveyed by the conveyance rollers 60a and the lower end of each of the rod 73b is fixed to the shaft 73a. The shaft 73c connects a middle portion (a little lower than its center) of the rod 73b located at the middle and extends in the conveyance direction of the cardboard box C which is conveyed by the conveyance rollers 60a. The air cylinder 73d is supported in a rotatable manner. The air cylinder 73d rotates the rod 73b by a predetermined angle (referring to FIG. 19) around the shaft 73a as the rotation center by moving the shaft 73c by switching a high-pressure air. The high-pressure air is supplied by the air source, using a switching valve 63a.

Roller-Elevating Mechanism 74 Structure

The roller elevating mechanism 74 mainly includes an air cylinder 74a which is disposed in the vertical direction, and a roller 74c which is supported by the upper end of a piston 74b of the air cylinder 74a. The air cylinder 74a is capable of changing a state of the roller 74c in which the roller 74c is placed below the conveyance rollers 60a (indicated by solid lines in FIG. 19) to a state in which the roller 74c is placed above the conveyance rollers 60a (indicated by dotted lines in FIG. 19). The state change is accomplished by switching the direction of the high-pressure air supplied by the air source using a switching valve 63b shown in FIG. 20. As seen in FIG. 19, the roller 74c is designed to rotate around a rotary axis along the conveyance direction of the cardboard box C which is conveyed by the conveyance rollers 60a. The roller 74c rotates when it makes contact with the cardboard box C and holds up the cardboard box C. The cardboard box C is prevented from being damaged by this rotation of the roller 74c.

Box-Raising Device Operation

The operation of the box-raising device 63 will be described with reference to FIGS. 19 and 25.

When the cardboard box C is conveyed to the box-raising device 63 from the box setting device 62 by the conveyance rollers 60a, the sensor 69c detects the box C and the controlling device 69 stops the conveyance. At that time, the cardboard box C is in the pushed-down state as indicated by continuous dotted lines in FIG. 19.

After stopping the conveyance of the cardboard box C, the controlling device 69 commands the roller 74c to push up the first surface C1 of the cardboard box C which forms a bottom surface in the pushed-down state of the box C. The roller 74c makes contact with a portion of the first surface C1 of the cardboard box C. The portion is located at a C1b side relative to the center of the first surface C1. The contact is made by the actuation of the air cylinder 74c and pushes up the cardboard box C in the vertical direction (referring to FIG. 25).

Then the state of the cardboard box C is changed as indicated by alternating single-dashed and dotted lines in FIG. 19 with a side C1a of the first surface as the rotation center. At that time, the cardboard box C is supported by the conveyance rollers 60a and the roller 74c.

Also, when the roller 74c starts pushing up the cardboard box C, the controlling device 69 actuates the air cylinder 73d to revolve the rod 73b. The timing to revolve the rod 73b is determined by a setting of a timer 69b (referring to FIG. 20) which adjusts the time between the actuation of the air cylinder 74a and that of the air cylinder 73d. The rod 73b starts revolving from a position indicated by solid lines in FIG. 19 and moves to a position indicated by single-dashed and dotted lines in FIG. 19 when the roller 74c pushes up the cardboard box C to a position indicated by single-dashed and dotted lines in FIG. 19. At that moment, as shown in FIG. 25, the upper end of the rod 73b makes contact with the second surface C2 of the cardboard box C which is standing by the side C1a of the first surface C1 being supported by the conveyance rollers 60a and the roller 74c.

Figure 25:
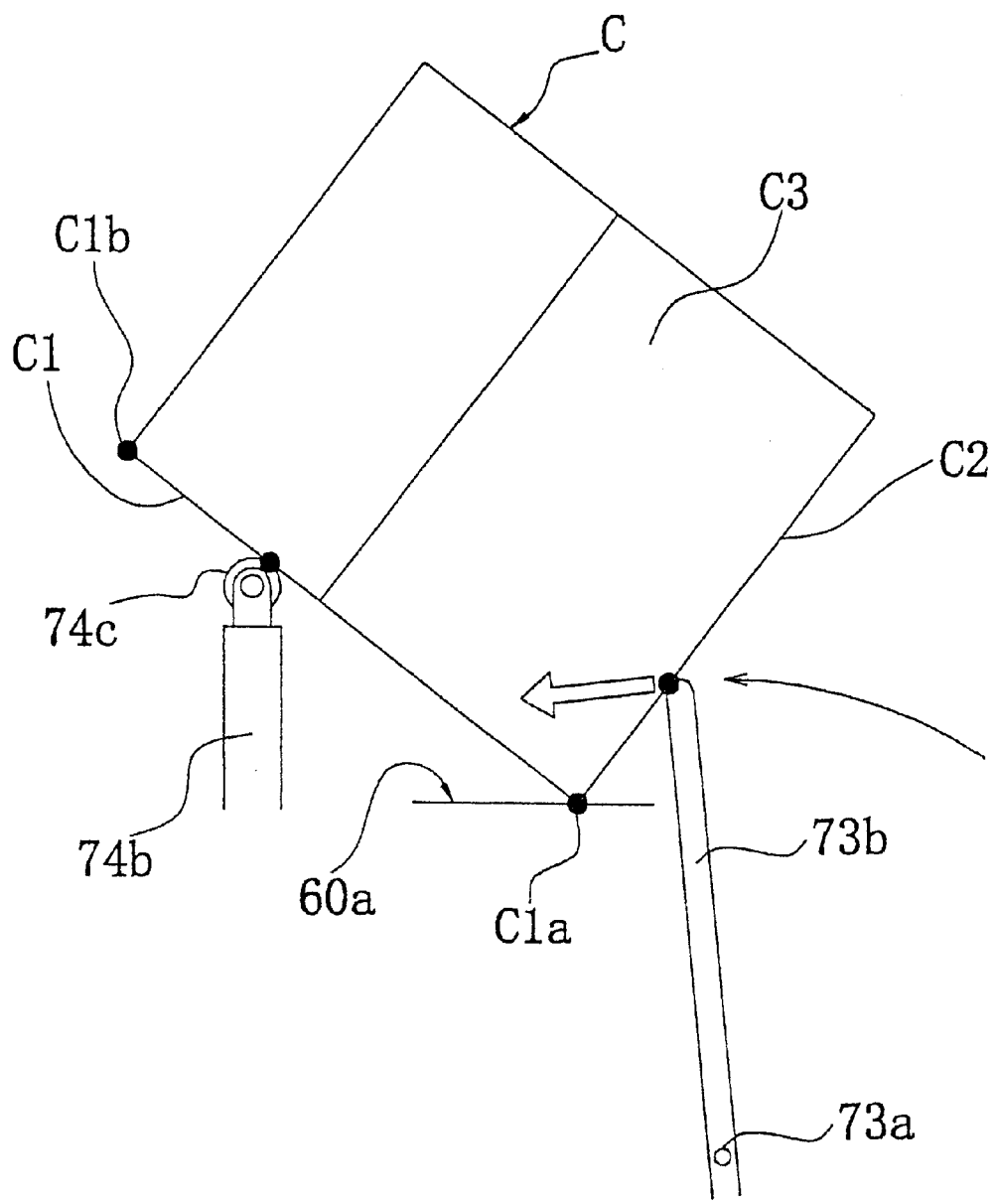
FIG. 25 is operational state diagram of a box-raising device.

As shown in FIG. 25, when the rod 73b makes contact with the second surface C2 of the cardboard box C, the end portion of the rod 73b applies a force to a portion of the second surface C2 which is located closer to the side C1a of the first surface C1 relative to the center portion of the second surface C2. As indicated by a white arrow in FIG. 25, the direction of this force is mainly horizontal from the side C1a of the first surface C1 to the C1b of the other end and includes a little component of the force in the vertical downward direction. That is, the direction of the force is substantially horizontal and the force includes a small component in the vertical downward direction.

When this force is applied to the second surface C2 of the cardboard box C from the end portion of the rod 73b, the second surface C2 of the cardboard box C is "swept." The next moment the cardboard box C lands on the conveyance rollers 60a in an upright state as indicated by single-dashed double-dotted lines in FIG. 19. When the cardboard box C lands on the conveyance rollers 60a, the rod 73b has already been revolved further and the end portion of the rod 73b has been moved to a position lower than the position of the upper face of the conveyance rollers 60a.

After the cardboard box C is conveyed by the conveyance rollers 60a and moved away from the box-raising device 63, the roller 74c and the rod 73b are returned to their respective original position to wait for the next cardboard box C to be conveyed.

Box-Raising Device Characteristics

In the box-raising device 63, the first surface C1 makes contact with the upper surface of the conveyance rollers 60a. Thus, the state of the cardboard box C is changed to an inclined state by the roller 74c. Then the state of the cardboard box C is changed further to a state in which its second surface C2 makes contact with the upper surface of the conveyance rollers 60a. This contact is made by "sweeping" the second surface C2 using the rod 73b. In this embodiment, the structure of the device can be made compact and simplified since members such as one holding the entire cardboard box C are not used.

Also, the force applied to the second surface C2 of the cardboard box C by the rod 73b contains a small component in the vertical downward direction and, hence, the box C can be raised up assuredly. Since the force includes the small component in the vertical downward direction, the impact applied to the cardboard box C is reduced. Thus, the possible shift in the position of the box C after it is raised up is reduced.

Moreover, as indicated by the single-dashed double dotted lines in FIG. 19, since the end portion of the rod 73b is moved to a position lower than the position of the upper surface of the conveyance rollers 60a when the cardboard box C is landed on the conveyance rollers 60a, the rod 73b does not interfere with the landing of the cardboard box C.

Further, an optimal raising up operation of the cardboard box C suitable for the type of the box C or the characteristics of bags to be packed can be found out by adjusting the setting of the timer 69d of the controlling device 69.

Packing System Overall Characteristics

In the packing system 1, although this is a packing system for packing bags arranged in a plurality of layers in one line which have been conveyed in a line from a previous process, the bags conveyed in one line are once directed to two directions by the directing unit 2. For this reason, the stacking and packing operations by the packing unit 5 are conducted after the bags are arranged on the conveyers 51a and 51b in two lines. Accordingly, the number of bags which can be stocked on the conveyers 51a and 51b or the conveyance adjusting conveyer 4 can be increased as compared with cases in which the bags are not directed in two directions. Thus, the processing speed of the packing system 1 as a whole can be increased without increasing the processing speed of the stacking device or the pushing device 55 of the packing unit 5.

Other Embodiments (A) Although the bags conveyed in one line are directed in the right or left direction by the directing unit 2 in the above-mentioned embodiment, a directing operation and a non-directing operation can be repeated for every second bag so that the bags can be directed in two directions. In that case, it is necessary to change the position of the elevator 54a in the packing unit 5.

Also, it is possible to direct the bags in three directions. This becomes possible by increasing the structure of the directing unit 2 or adding another directing unit of the same type.

Moreover, the direction in three different directions can be realized by controlling the transferring operation of a transferring mechanism. For example, three of a plurality of articles conveyed in one line can be controlled as one cycle. That is, for instance, first article can be directed to the right direction, the second one can not be directed, and the third one can be directed to the left direction and this cycle is repeated. The order of the cycle is not limited as above and can be changed. In addition, articles can be directed to the same direction every third one or fourth one, etc.

In the above-mentioned cases, the structure of the packing unit 5 must be adapted to three or more lines of articles and, for instance, a device corresponding to the slider 53 can be disposed at both sides of the elevator 54a.

(B) Although the holding plate 28d is a flat plate as shown in FIGS. 7A–7E in the above embodiment, if a device such as a belt conveyer which is capable of driving the plate 28d in the right and left directions is added, the direction of the bag P can be conducted more efficiently. This is because such a device can function together with the movement of the lower eccentric pulleys 25 and the V-belt. Also, it is possible to preset the movement of the holding plate 28d in the up-and-down direction so that it becomes most suitable for the characteristics of the bag P.

Moreover, it is possible to set the movement of the holding plate 28d in the up-and-down direction at the lowest point at an initial stage of the directing operation and gradually increase in the upward direction later. In this manner, an error in applying a force to move the bag P can be avoided at the initial stage of the directing operation. At the later stage, problems such as contents of the bag becoming one-sided due to the difference in the force applied to the right and left sides of the bag or one-sided conveyance can be avoided.

Further, the present invention can be performed by using a round belt or a flat belt instead of the V-belt 26.

In addition, it is possible to use a plurality of conveyers instead of the eccentric pulleys 25. In such case, the same effect as in the above-mentioned embodiment can be obtained by driving the entire conveyer at the upper limit using motors or air cylinders. Also, the similar effect can be obtained by using a belt, instead of the eccentric pulleys 25 and the V-belt 26, whose thickness has been changed as disclosed in Japanese Utility Model Publication No. 58-44101.

(C) Although a position change of bags is conducted in the position-adjusting unit 3 when the right-hand and the left-hand side position changing guides 38 and 39 are used in the above-mentioned embodiment, the rotary direction of the bags in each line is contrary. Hence, each of the bags alternately faces different directions when packed in a box if they faced the same direction as conveyed in one line from the previous process.

Figure 26:
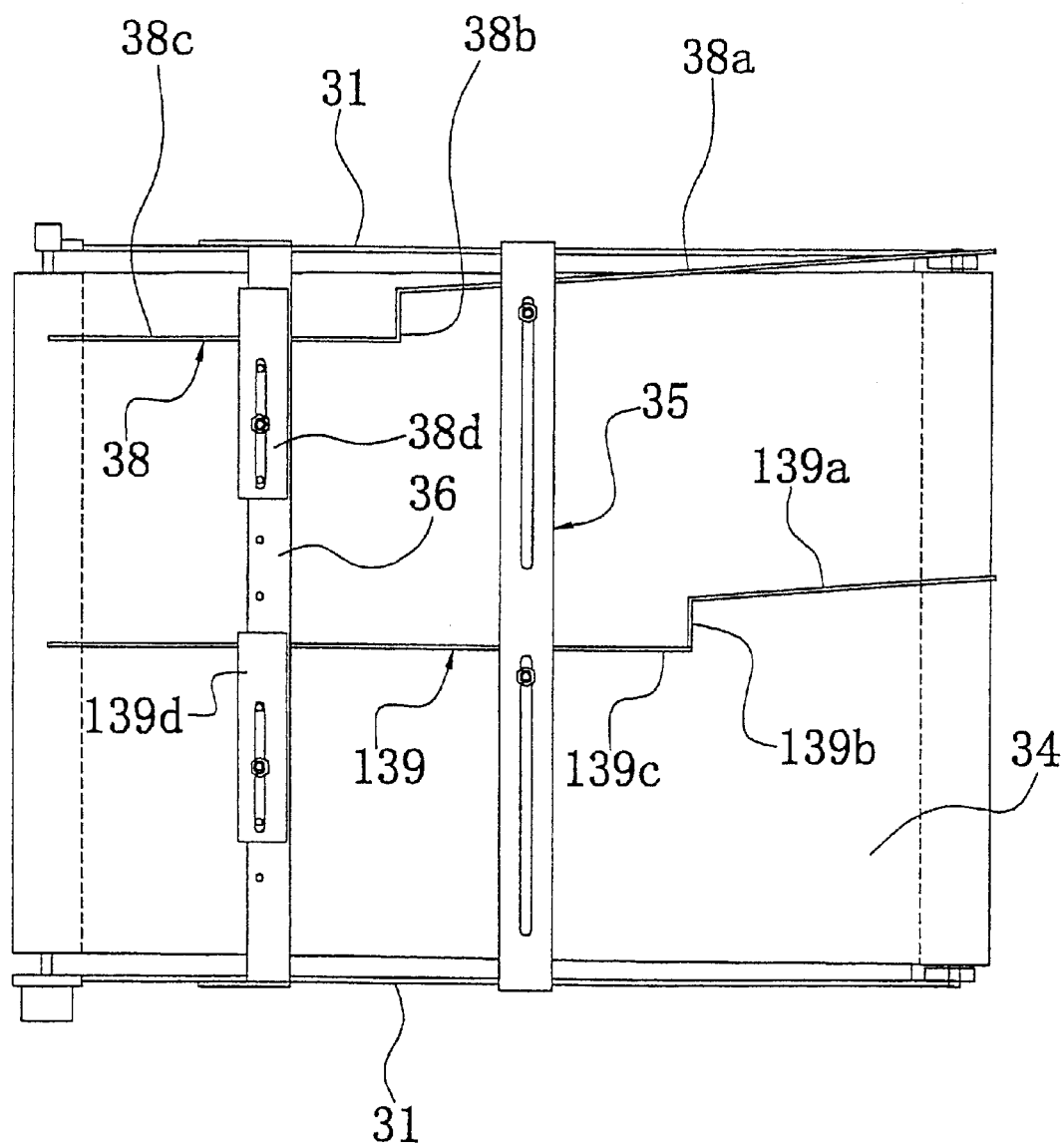
FIG. 26 is a plan view of a position-adjusting unit in an alternate embodiment.

In order to avoid this problem, a left-hand side position changing guide 139 as shown in FIG. 26 can be prepared for the position-adjusting unit 3 in addition to the right and the left hand side position changing guides 38 and 39. The left-hand side position-changing guide 139 includes an inclined surface 139a, a first colliding surface 139b, a second colliding surface 139c, and a bracket 139d. The inclined surface 139a corresponds to the inclined surface 39a of the left-hand side position changing guide 39. The first colliding surface 139b corresponds to the first colliding surface 39b. The second colliding surface 139c corresponds to the second colliding surface 39c. The bracket 139d corresponds to the brackets 39d and 39e.

If this left-hand side position-changing guide 139 and the right-hand side position changing guide 38 are used together in an arrangement shown in FIG. 26, bags in both lines can be rotated in the same direction.

In addition, in order to adjust the area of the first colliding surface which makes contact with the bag in accordance to the hardness of the bag, the position of an article position changing member can be varied when it is attached. Alternatively, a plurality of article position changing members having a different size or shape of the first colliding surface can be prepared depending on the hardness of the bags.

(D) Although the bags, which has been conveyed in two lines, are stacked in six layers in one line and packed in the cardboard box C by the packing unit 5 in the above embodiment, it is possible to stack the bags in five layers in one line and packed in the cardboard box c. This operation will be described with reference to FIGS. 22A through 22J.

Figure 22A:
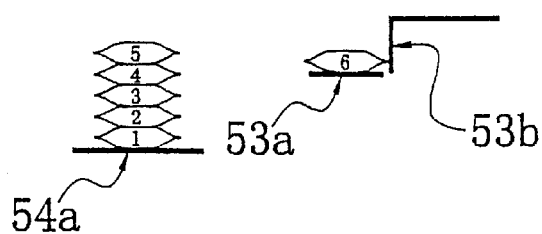
FIGS. 22A–22J are stacking device operational diagrams, wherein FIG. 22A corresponds to the state depicted in FIG. 21I.
Figure 22B:
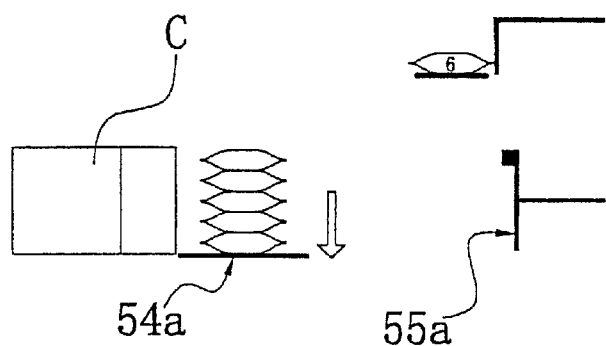

In this embodiment, bags are stacked on the elevator 54 in the same manner as in the above-mentioned embodiment until the state shown in FIG. 21I (which is the same state as in FIG. 22A). In this state in which bags are stacked in five layers in one line on the elevator 54a, the elevator 54a is lowered to the lowest position as shown in FIG. 22B without moving the slider 53. Thus, bags are still present on the first slider 53a.

Figure 22C:
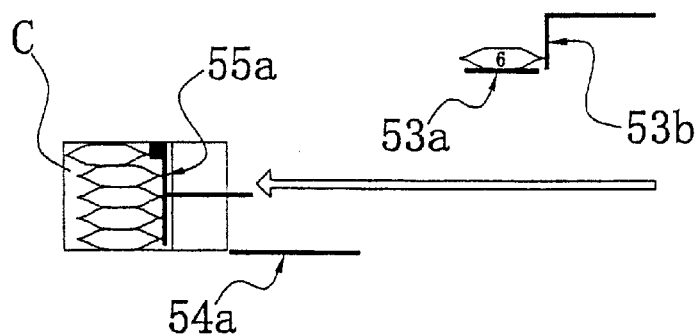
Figure 22D:
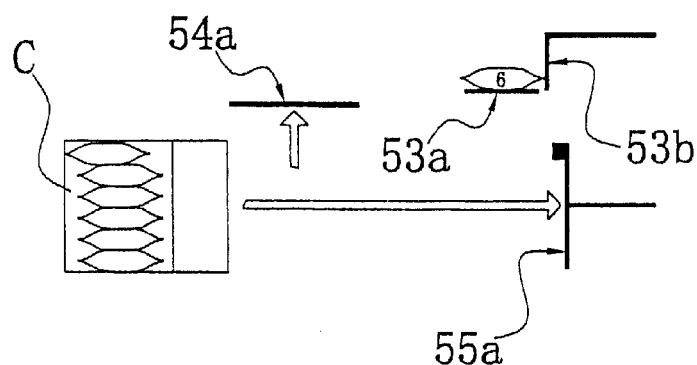

Then, as shown in FIG. 22C, the bags stacked in five layers in one line (a total of 15 bags) on the elevator 54a are pushed in the cardboard box C by using the pusher 55a. When the pusher 55a is returned to its original position, the elevator 54a is raised to a position one step lower than its highest position (referring to FIG. 22D).

Figure 22E:
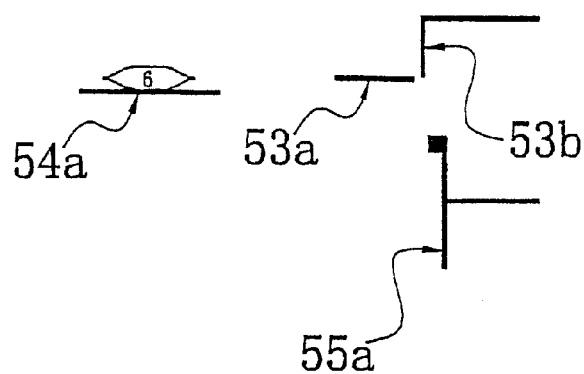
Figure 22F:
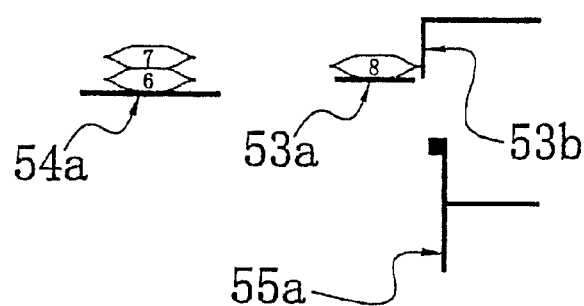
Figure 22G:
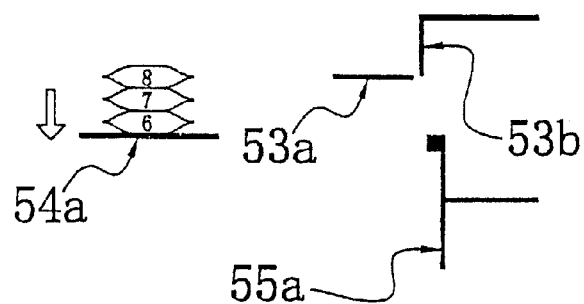
Figure 22H:
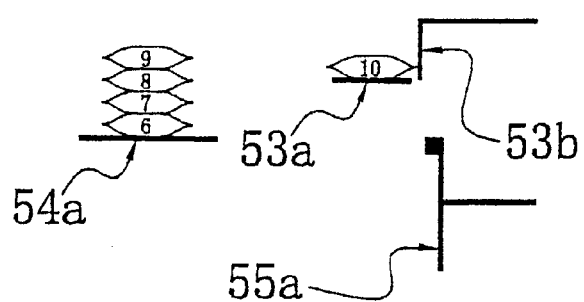
Figure 22I:
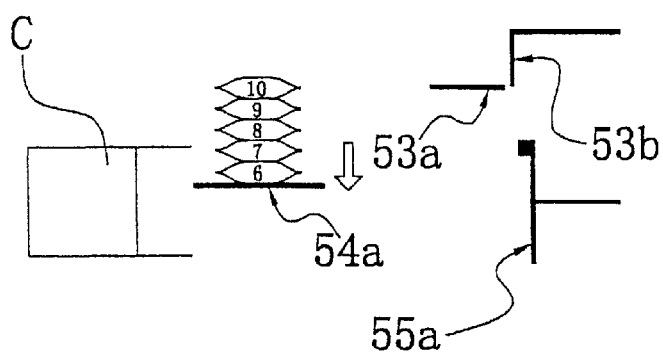
Figure 22J:
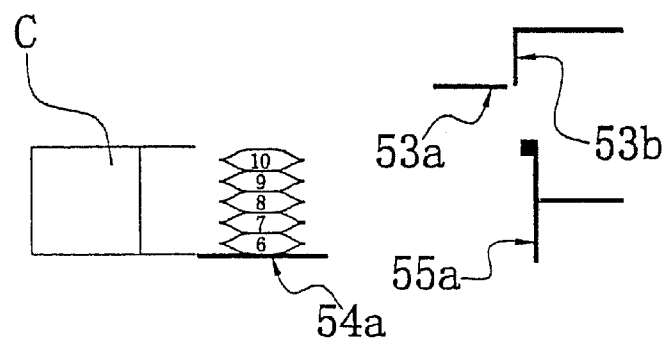

Then the bags on the first slider 53a are moved onto the elevator 54a by using the first slider 53a and the second slider 53b (referring to FIG. 22E). If bags are conveyed twice by the transferring device 52 from this state, the state shown in FIG. 22H is realized via the states shown in FIGS. 22F and 22G. At this stage if the bags on the first slider 53a are transferred onto the elevator 54a, the bags arranged in five layers in one line are stacked on the elevator 54a (referring to FIG. 22I). Then, as shown in FIG. 22J, the elevator 54a is lowered to the lowest position so that the pusher 55a can conduct a packing operation. After that the system returns to the state shown in FIG. 21A.

By controlling the system as mentioned above, the packing operation can be carried out smoothly without having any waiting period even for cases in which an odd number of layers of bags are stacked and packed in a box.

(E) As seen in FIG. 15, the protruding member 55e is attached to the upper portion of the vertical contacting surface of the pusher 55a in the above-mentioned embodiment. However, the protruding member 55e need not be a separate member which can be attached to the pusher 55a. A pusher having an upper portion protruding towards the cardboard box C side can be used.

As seen in FIG. 17, although the rod revolving mechanism 73 is actuated after the roller elevating mechanism 74 is actuated in the above-mentioned embodiment, this order is only necessary in the box raising operation. They can be operated independently in other circumstances depending on the condition. The same is applied for the relationship between the roller elevating mechanism 72 and the rod revolving mechanism 71. Moreover, it is possible to exchange the function of the roller elevating mechanism 72 and the rod revolving mechanism 71 for the function of the roller elevating mechanism 74 and the rod revolving mechanism 73.

Moreover, if the positional relationship between the roller elevating mechanism 72 and the rod revolving mechanism 71 or between the roller elevating mechanism 74 and the rod revolving mechanism 73 is improper because of the conveyance direction of the box or the size of the box, or if the conveyance position of the box is improper, the box can be moved to a suitable position by using the rod revolving mechanism 71 or the rod revolving mechanism 73. Further, the roller elevating mechanism 72, the roller elevating mechanism 74, the rod revolving mechanism 71, and the rod revolving mechanism 73 can be constructed so as to be movable in the direction perpendicular to the conveyance direction of the box and they can be moved to a respective suitable position. In addition, the roller elevating mechanism 72 and the roller elevating mechanism 74 can be tilted so that the roller 72c and the roller 74c can make contact with a suitable portion of a box.

Further, the portion of the box with which the roller elevating mechanism 72 and the roller elevating mechanism 74 make contact in the box-toppling device 61 and the box-raising device 63 is a side surface of the box other than the flap F (referring to FIG. 24). It is preferable that the portion be closer to the flap F between the center portion of the side surface of the box and the flap F. For this reason, the roller elevating mechanism 72 and the roller elevating mechanism 74 can be constructed so as to be movable in the direction perpendicular to the conveyance direction of the box and moved to a respective suitable position, Thus, the mechanisms 72 and 74 make contact with the box at a respective desired position. In addition, the roller elevating mechanism 72 and the roller elevating mechanism 74 can be tilted so that the roller 72c and the roller 74c can make contact with a side surface of a box.

(F) Although only the operation in which the holding plate 28d and the up-and-down members (28b and 28c) do not move is explained in the above-mentioned embodiment, it is possible to design the system so that a force is always applied to the bags P by the holding plate 28d when the bags P are directed.

Figure 28C:
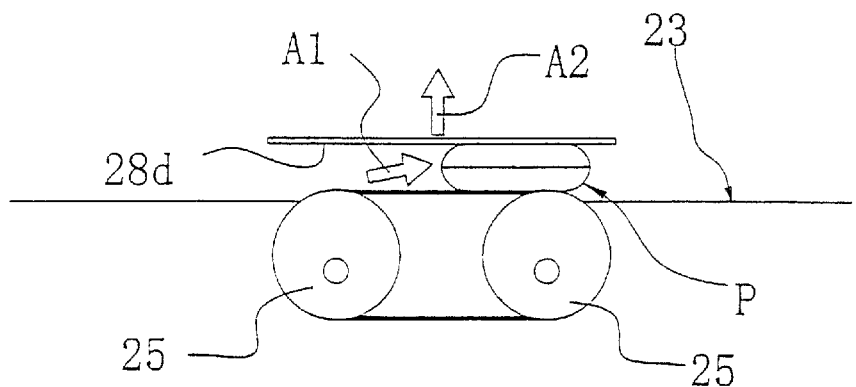

In such a case, as shown in FIG. 28C, when the bag P is pushed up by the V-belt 26 and lifted above the feed roller 23, the bag P is moved in the side direction as indicated by an arrow A1. Then the holding plate 28d is pushed up and moved in the upward direction as indicated by an arrow A2 by the bag P. For this reason, damage which can caused to the contents of the bag P by the collision of the bag P against the holding plate 28d can be minimized. Also, the weight of the holding plate 28d is applied to the bag P at that time and, if the thickness (volume) of the bag P has been increased due to such factors as deformation, it is returned to the normal state. Thus, problems such as the bags not being pushed in a cardboard box during a packing operation can be avoided.

While only selected embodiments have been chosen to illustrate the present invention, to those skilled in the art it will be apparent from this disclosure that various changes and modifications can be made herein without departing from the. scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A mechanism for distributively directing an article conveyed in a conveyance direction on a conveyer in a packing system, the mechanism comprising:

a force-imparting member for applying to the article a directing force having a lateral component crossing the conveyance direction such that the article changes its position laterally within the conveyer, said force-imparting member including a first shaft disposed at a position lower than an upper surface of the conveyer, a driver connected to said first shaft for rotating said first shaft, and a first eccentric member having a first radius and a second radius, said first radius being a longest distance between said first shaft and a periphery of said first eccentric member, said second radius being a shortest distance between said first shaft and the periphery of said first eccentric member, said first eccentric member being attached to said first shaft to rotate therewith, such that an upper surface of said first eccentric member reaches above the upper surface of the conveyer and the directing force is applied to the article at least when said first radius is pointing upward, and the upper surface of said first eccentric member is below the upper surface of the conveyer at least when said second radius is pointing upward; and a holding member disposed above the conveyer for preventing the article from being lifted more than a predetermined height when the directing force is applied to the article by said force-imparting member.

2. A mechanism-as set forth in claim 1, wherein said force-imparting member further comprises:

a second shaft provided in addition to said first shaft;

a second eccentric member attached to said second shaft; and a belt provided on said first and second eccentric members for connecting said first and second eccentric members.

3. A mechanism as set forth in claim 1, further comprising:

a controlling device having a sensor located above the conveyer, for detecting presence of the article and controlling said force-imparting member to apply the directing force to the detected article in one of alternate directions laterally displaced from the conveyance direction.

4. A mechanism as set forth in claim 3, wherein said driver starts rotating said first shaft after said sensor detects the article.

5. A mechanism as set forth in claim 4, wherein said driver switches rotational direction of said first shaft in response to said sensor detecting the article.

6. A mechanism as set forth in claim 1, wherein said holding member is supported in said mechanism such that said holding member is shiftable up and down by the directing force as the directing force is applied to the article.

7. A mechanism as set forth in claim 6, wherein said holding member under its own weight governs lift of the article.

8. A mechanism as set forth in claim 1, further comprising a pair of guides located above the conveyer and flanking said holding member, for guiding the article having received the directing force applied by said force-imparting member.

9. A mechanism as set forth in claim 1, wherein:

said force-imparting member has a transferring surface enabling carrying and transferring of the article; and said holding member has a holding surface for upper-surface contact with the article, said holding surface having a lower frictional coefficient than that of said transferring surface.

10. A mechanism as set forth in claim 9, wherein said holding member governs lift of the article to keep the article from being lifted off said transferring surface by said force-imparting member applying the directing force to the article.

11. A mechanism as set forth in claim 9, wherein said holding member has a vertically slidable vertical member, and a horizontal member having said holding surface.

12. A mechanism as set forth in claim 1, wherein the article is a bagged product.

13. A system for packing an article, comprising:

a conveyer for conveying the article in a conveyance direction, a directing unit for moving the article laterally within said conveyer such that the article changes its position laterally within the conveyer, said directing unit including a force-imparting member for applying to the article a directing force having a lateral component crossing the conveyance direction, said force-imparting member including a first shaft disposed at a position lower than an upper surface of the conveyer, a driver connected to said first shaft for rotating said first shaft, and a first eccentric member having a first radius and a second radius, said first radius being a longest distance between said first shaft and a periphery of said first eccentric member, said second radius being a shortest distance between said first shaft and the periphery of said first eccentric member, said first eccentric member being attached to said first shaft to rotate therewith, such that an upper surface of said first eccentric member reaches above the upper surface of the conveyer and the directing force is applied to the article at least when said first radius is pointing upward, and the upper surface of said first eccentric member is below the upper surface of the conveyer at least when said second radius is pointing upward, and a holding member disposed above said conveyer for preventing the article from being lifted more than a predetermined height when the directing force is applied to the article by said force-imparting member, a position-adjusting unit located adjacent said directing unit, for adjusting position of the article that has passed through said directing unit; and a packing unit located adjacent said position-adjusting unit, for packing the article that has passed through said position-adjusting unit into a box.

* * * * *